United States Patent
Chodavarapu et al.

(10) Patent No.: US 10,782,235 B2
(45) Date of Patent: Sep. 22, 2020

(54) METHODS AND DEVICES FOR XEROGEL BASED SENSORS

(71) Applicant: THE ROYAL INSTITUTION FOR THE ADVANCEMENT OF LEARNING/MCGILL UNIVERSITY, Montreal (CA)

(72) Inventors: Vamsy Chodavarapu, Brossard (CA); Daisy Daivasagaya, Montreal (CA); Adel Merdassi, Montreal (CA)

(73) Assignee: THE ROYAL INSTITUTION FOR THE ADVANCEMENT OF LEARNING / MCGILL UNIVERISTY, Montréal (CA)

(*) Notice: Subject to any disclaimer, the term of this patent is extended or adjusted under 35 U.S.C. 154(b) by 345 days.

(21) Appl. No.: 14/809,715

(22) Filed: Jul. 27, 2015

(65) Prior Publication Data
US 2016/0033413 A1 Feb. 4, 2016

Related U.S. Application Data

(63) Continuation of application No. 14/030,139, filed on Sep. 18, 2013, now abandoned.
(Continued)

(51) Int. Cl.
*B01L 3/00* (2006.01)
*G01N 21/64* (2006.01)

(52) U.S. Cl.
CPC .... *G01N 21/6456* (2013.01); *B01L 3/502715* (2013.01); *G01N 21/645* (2013.01);
(Continued)

(58) Field of Classification Search
None
See application file for complete search history.

(56) References Cited

U.S. PATENT DOCUMENTS

| | | | | |
|---|---|---|---|---|
| 2007/0116607 A1* | 5/2007 | Wang | .............. | B01L 3/502715 422/83 |
| 2007/0298514 A1* | 12/2007 | Gomes Correia | .......................... | B01L 3/502715 436/164 |

(Continued)

OTHER PUBLICATIONS

Cho et al. Multianalyte Pin-Printed Biosensor Array Based on Protein-Doped Xerogels, Anal. Chem 2002, pp. 6177-6184, vol. 74. (Year: 2002).*

(Continued)

*Primary Examiner* — Neil N Turk
(74) *Attorney, Agent, or Firm* — Norton Rose Fulbright Canada LLP; Reno Lessard

(57) ABSTRACT

Chemical sensors today are deployed in massive volumes across multiple industries and yet at the same time they are subject to substantial research and development effort to establish new, faster, lower cost, more accurate, more sensitive chemical sensors. Such sensors and sensor arrays are being exploited across chemistry, biology, clinical biology, environmental science in civilian and military markets. Amongst the many sensor methodologies are xerogel substrates with two moieties, a receptor for molecular recognition of the analyte and a luminophore for signaling the recognition event. In order to fulfill the requirements for low cost there is a requirement for electronic excitation/read circuits that can support architectures with optical source—N sensors—X filters—M detectors, where M≥N and X=N|M. According to embodiments of the invention electronic excitation/read circuits for phase based luminophore sensors are presented that are compatible with single CMOS chip implementation and monolithic integration of the optical excitation/detection elements.

5 Claims, 12 Drawing Sheets

Related U.S. Application Data

(60) Provisional application No. 61/702,350, filed on Sep. 18, 2012.

(52) U.S. Cl.
CPC ..... *G01N 21/6408* (2013.01); *G01N 21/6428* (2013.01); *G01N 21/6452* (2013.01); *G01N 21/6454* (2013.01); *G01N 2021/6419* (2013.01); *G01N 2021/6421* (2013.01); *G01N 2021/6439* (2013.01); *G01N 2021/6441* (2013.01); *G01N 2201/062* (2013.01)

(56) References Cited

U.S. PATENT DOCUMENTS

| | | | | |
|---|---|---|---|---|
| 2009/0264308 | A1* | 10/2009 | Broer | B01L 3/508 506/9 |
| 2010/0001185 | A1* | 1/2010 | Bright | G01N 21/6428 250/308 |
| 2012/0123291 | A1* | 5/2012 | Lin | A61B 5/0532 600/548 |

OTHER PUBLICATIONS

R.M. Bukowski, V. P. Chodavarapu, A.H. Titus, A.N. Cartwright and F.V. Bright "Phase fluorometric glucose biosensor using oxygenas transducer and enzyme-doped xerogels" Electronics Letters Feb. 15, 2007 vol. 43 No. 4.

B.D. Mac Craith, C. Mc Donagh, A.K. McEvoy, T. Butler, G. O'Keeffe and V. Murphy "Optical Chemical Sensors Based on Sol-Gel Materials: Recent Advances and CriticalIssues" Journal of Sol-Gel Science and Technology 8, 1053-1061 (1997).

Tao Huang and Royce W. Murray "Quenching of [Ru(bpy)3]2+ Fluorescence by Binding to Au Nanoparticles" Langmuir 2002, 18,7077-7081.

Lei Yao, Rifat Khan, Vamsy P. Chodavarapu, "Sensitivity-Enhanced CMOS Phase Luminometry System Using Xerogei-Based Sensors" IEEE Transactions on Biomedical Circuits and Systems, vol. 3, No. 5, Oct. 2009.

Farrington et al., "Facebook's Data Centre Network Architecture", IEEE Optical Interconnects Conference, 2013 available at http://nathanfarrington.com/presentations/facebook-optics-oida13-slides.pptx.

\* cited by examiner

METHODS AND DEVICES FOR XEROGEL BASED SENSORS

CROSS-REFERENCE TO RELATED APPLICATIONS

This patent application is being filed as a Continuation of U.S. patent application Ser. No. 14/030,139, filed 18 Sep. 2013, currently pending, and claims the benefit of U.S. Provisional Patent Application 61/702,350 filed on Sep. 18, 2012 entitled "Methods and Devices for Xerogel Based Sensors."

FIELD OF THE INVENTION

This invention relates to sensors and more particularly to fluorescence based sensors exploiting gels.

BACKGROUND OF THE INVENTION

Chemical sensing refers to the continuous monitoring of the presence of chemical species and today it is hard to stress the importance of such sensors as they are both deployed in massive volumes across multiple industries and yet at the same time they are subject to substantial research and development effort to establish new, faster, lower cost, more accurate, more sensitive chemical sensors. Many disciplines exploit chemical sensing systems, including chemistry, biology, clinical biology and environmental science. For example, analytical methods to study cell chemistry and to understand the mechanisms that make cells work are highly desirable. Therefore, sensors for biomolecules such as neurotransmitters, glutamate and acetylcholine, glycine, aspartate and dopamine, nitrogen oxide (NO) and adenosine triphosphate (ATP) would be very helpful.

Similarly, it is beneficial to develop sensors for metal ions such as sodium, potassium, and calcium which are involved in biological processes such as transmission of nerve pulses, muscle contraction and regulation of cell activity as well as aluminum which is toxic and linked to Alzheimer's disease is being discussed. In the field of environmental science, it is well known that mercury, lead and cadmium are toxic for living organisms, and thus early detection in the environment is desirable. Additionally, sensors for explosives and hazardous chemicals are being extensively investigated for the detection of landmines and warfare chemicals. With the war on terrorism, the need for accurate, reliable, real-time biological and chemical sensing is in the spotlight. Finally, chemical sensing allows for the study and control of chemical processes from the laboratory to the industrial scale, and plays an important role in the food industry for the control of food quality and safety. The list of interesting analytes to be detected is lengthy and there is a need for rapid and low-cost testing methods for a wide range of clinical bioprocesses as well as in areas of chemical and environmental applications.

Many features make fluorescence one of the most powerful transduction mechanisms to report a chemical recognition event. A number of fluorescence microscopy and spectroscopy techniques based on the life-time, anisotropy or intensity of the emission of fluorescent probes have been developed over the years. These are enormously sensitive techniques that allow in some circumstances the detection of single molecules. Fluorescence sensors do not consume analytes and no reference is required. Light can travel without physical waveguide, facilitating enormously the technical requirements of exciting and measuring thereby making it possible to perform remote monitoring either within biological systems or within dangerous/toxic environments. For example, it is possible to monitor simultaneously concentrations of the target analytes in all regions of a living cell. Beneficially, fluorescence spectroscopy allows different assays to be implemented based on different aspects of the fluorescence output (lifetime, intensity, anisotropy and energy transfer). Additionally, laser fiber optics and detection technologies are well established. Therefore, fluorescence techniques form one of the most important detection methods for miniaturized ultra-high-throughput screening of multiple analytes.

Design of Fluorescent Indicators: The classical design of a fluorescent indicator includes two moieties, a receptor responsible for the molecular recognition of the analyte and a fluorophore responsible of signaling the recognition event. There are three main strategies to approach the design of fluorescent molecular indicators for chemical sensing in solution. The first results in intrinsic fluorescent probes which are fluorescent molecules where the mechanism for signal transduction involves interaction of the analyte with a ligand that is part of the it $\pi$-system of the fluorophore. The second are extrinsic fluorescent probes, in which the receptor moiety and the fluorophore are covalently linked but are electronically independent. The extrinsic probes have also been denoted conjugate; nevertheless, for homogeneity reasons, we prefer to call then "extrinsic." In this case, different receptor molecules might be synthesized and afterwards attached to a fluorophore to make the sensitive probe. Due to the covalent linking through a spacer both moieties are in close proximity; the interaction of the analyte with the receptor induces a change in the fluorophore surroundings and changes its fluorescence. The third strategy called a chemosensing ensemble, based on a competitive assay in which a receptor-fluorophore ensemble is selectively dissociated by the addition of an appropriate competitive analyte able to interact efficiently with the receptor resulting in a detectable response of the fluorophore.

Fluorescent Materials for Chemical Sensing: After the production of a fluorescent indicator the next step toward the fabrication of a sensor is usually the production of the sensing material by the incorporation of the indicator in a solid support. Until now the most common approach for the immobilization step is the physical entrapment of the sensitive probe in a polymer matrix. After the entrapment the polymer is deposited on a device such as an optical fiber or the surface of a waveguide to create the working sensor. However, physical entrapment of the dyes in the polymer matrix produces inhomogeneity in the material and gives stability problems due to the leaching of the fluorescent probe, reducing the lifetime and reproducibility of the sensor. To improve the stability of these materials, the alternative is the covalent attachment of the probes to the polymeric matrices. Parallel to the production of polymeric materials, new trends in material science for chemical sensing are emerging. Other materials have been developed where the components of a sensing system (receptor and fluorophore) are directionally confined in a physical space, i.e. they are covalently immobilized at a surface or form surfactant aggregates. A number of materials such as silica particles, glass and gold surfaces, quantum dots, Langmuir-Blodgett films, vesicles, liposomes, and others are used combined with many chemical receptors to create sensitive fluorescent materials.

Sol-Gel Materials: Sol-gel materials encompass a wide number of inorganic and organic/inorganic composite materials which share a common preparation strategy. The sol-gel process is a method for the synthesis of ceramic and glass materials at low temperature. In a typical sol-gel process, a colloidal suspension, or a "sol" is formed via hydrolysis of alkoxy metal groups in the precursors and subsequent poly-condensation. The result is a network with a glass-like structure which after the synthesis can be processed to a variety of shapes such as thin films, gels and ceramics.

Based on the sol-gel process many different materials can be prepared and envisioned. Fluorescent dyes can be easily incorporated yielding doped glasses with powerful sensing applications. They have good optical properties, lack spectral interference (transparency and high refractive index), possess high mechanical and chemical stability, minimal quenching of fluorescence reagents and ease of fabrication. Since sol-gels can be fabricated at low temperatures this allows the incorporation of organic molecules and polymers, leading to materials with added functionality which cannot be obtained otherwise. Additionally these materials are obtained from solution, which allows the convenient production of films and bulk materials of any possible shape. A major advantage of the sol-gel method is also that it produces porous materials whose pore-size distribution can be controlled by the chemical composition of the starting material and by the processing conditions.

Another feature of sol-gels is their excellent adhesion to glass and other silica substrates due to the covalent linkage that is formed with the silanol groups of the glass surface. Organic molecules can be entrapped in a sol-gel matrix while still being accessible from solution. The main problem dealing with these materials is that the diffusion of the analyte to reach the recognition site is very slow. Leaching of the probes can also be a problem when continuous monitoring is needed. Accordingly sol-gel matrices can be formed on low cost glass substrates as well as being integrated onto silicon substrates with silica buffer layers where the native oxide that automatically forms is insufficient.

There are three methods to immobilize fluorophores or indicators in sol-gels: impregnation, which involves the chemical or physical adsorption on the glass surface, chemical doping incorporation of the dye during the formation of the sol-gel glasses, and covalent immobilization. Sensors made by physical entrapment generally cannot be used after several weeks because a fraction of the dye molecule is usually leached. More stable sensors are prepared by covalent attachment of the dye to the polymer. However, doping is actually the most common method for entrapment of the fluorophore in the glass. Within the prior art some research has suggested that covalent attachment might compromise the sensor performance by slower response times and smaller signal changes.

Hydrophobic sol-gels based on precursors modified with organic groups, also referred to as ormosil glasses, show low penetration of water which generally makes them appropriate for sensing of gases. Liposomes, miniaturized containers for fluorescent sensing reagents are an alternative to covalent conjugation of the fluorescence molecules to phospholipid membranes or dextran chains. The encapsulated fluorophores keep their solution properties, high emission, quantum yield and sensing capability. Encapsulation of the fluorescent probe is an effective way to prevent dye leaking because it increases the size of the dye system and reduces the desorption of the dye from the matrix. In addition to the incorporation in a sol-gel material, individual loaded liposomes have been used as nanosensors for intracellular pH and molecular oxygen sensing.

In 2002 Cho and Bright combined sol-gel processing methods with pin printed technologies to fabricate a micrometer-scale xerogel sensor on a planar substrate. Sensor elements of the order of 100 μm in diameter and 1-2 μm thick at a rate of one sensor element per second and per pin have been reported. Arrays of sensor elements for O2 and pH sensing based on xerogels doped with tris(4,79-diphenyl-1,109-phenanthroline) ruthenium(II) and fluorescein respectively, have been demonstrated with such pin-printed xerogel sensors. High reproducibility was obtained for the detection of O2 and pH changes in aqueous samples. The concept has also been applied to create pin-printed biosensor arrays based on protein-doped xerogels.

Special attention in some instances must be paid to the long-term stability and flexibility of the material where the sensor is intended for monitoring type applications rather than simple detection. By varying the sol-gel processing conditions, molecularly imprinted sol-gel materials (MIP) with controlled porosity and surface area have been prepared and used for the separation, catalysis, receptors synthesis, selective adsorption, and pre-concentration of the template molecules. While molecular imprinted sol-gels have been prepared to date in varying geometries with multiple materials for several applications the combination of fluorescent sensing with molecular imprinted sol-gels has been reported in only a few instances. In some instances, a fluorescent MIP material fabricated by conventional sol-gel processes has been shown to demonstrate enhanced fluorescence upon interaction with the analyte. One such example being the polymerization of 3-[N,N-bis(9-anthrylmethyl) amino]propyltriethoxysilane, which acts as a photoinduced electron transfer (PET) monomer, and reported for the detection of a non-fluorescent herbicide (2,4-dichlorophenoxyacetic acid) in water. This new type of organic-inorganic hybrid MIP showed a significant affinity and selectivity for the analyte in aqueous media.

Another approach reported is sacrificial spacer molecular imprinting. The template used to generate the binding site for the analyte on the polymer, is covalently linked to the polymer. Subsequently the template is cleaved off and the recognition pocket is formed. In some designs a polarity sensitive fluorophore, such as 7-nitrobenz-2-oxa-1,3-diazol-4-yl (NBD) for example, may be incorporated close to the recognition site to signal the binding of the analyte, such as 1,1-bis(4-chlorophenyl)-2,2,2-trichloroethane (DDT) with NBD as the fluorophore, within the imprinted binding pocket. The fluorescence intensity of the NBD dye increases in non-polar solvents, so displacement of water or other polar solvent close to the NBD by the analyte results in a fluorescence enhancement. The film produced in this way had a detection limit for DDT of 50 ppt in aqueous solution.

From the prior art covalent immobilization of fluorescent probes to several materials has been proven very useful in terms of device implementation because it allows the production of stable and reusable materials. Further, the incorporation of fluorescent probes with sol-gels allows for fluorescent probes to be used in conjunction with a wide number of inorganic and organic/inorganic composite materials. Such materials in conjunction with combinatorial methods and the fabrication of sensor arrays, either to select the best system or to enhance the performance of non-selective systems by the fabrication of cross-reactive sensor arrays, are paving the way towards efficient compact low cost sensors for multiple analytes.

Among the possible substrates, immobilization of the sensing probes on glass surfaces has typically been used to produce efficient arrays of fluorescent chemosensors because of simplicity, efficiency, and high stability with low cost substrates having optical transparency in the visible and infrared but absorption in the ultraviolet so that probe filtering is accomplished with the glass slide. Fused quartz rather than silicate or borosilicate allows ultraviolet transparency as well providing increased flexibility in optical excitation through the substrate. Accordingly, protein and DNA microchips, high-density microarray sensors on glass slides for environmental sensing and food control may be easily envisioned. In other instances the fact that multianalyte sensors and on-line monitoring are requirements within the sensor design is driving advances in other technologies, such as microfluidic devices, in order to provide the require functionality in small low cost assemblies.

However, all of these advances in sensor technology through sol-gels and fluorescent probes require an optical source, to provide the excited electronic states of the fluorescent material, and optical detector, to receive the emitted optical signal from the fluorescent material and an electronic circuit to receive the photodetector output and generate a reading of the analyte being measured by that particular fluorescent probe. In multisensory arrays a plurality of optical sources may be required, according to the characteristics of the multiple fluorescent materials and the sensor array design in addition to the optical detector per sensor site. Accordingly, in order to provide an overall low cost sensor the electronic circuit should also be implementable at low cost, which generally implies implementing the electronics in a high volume silicon process such as CMOS. Accordingly it is beneficial for the electronics to be implemented with a circuit implementable in CMOS.

As indicated in FIG. 1 below luminescence based sensors can exploit spatial and temporal techniques to derive information relating to the presence/absence or quantity of an analyte. Direct time domain measurements of the excited-state lifetimes of the fluorescent materials necessitates high speed signal detection and processing circuits to interface to the optical detectors as these excited-state lifetimes are relatively short, typically ranging from a few hundred nanoseconds to several microseconds. Phase luminometry is, however, a viable alternative to time domain methods as the signal processing and signal detection requirements are lower complexity as evident from the following outline of phase based luminescent oxygen sensing.

The oxygen ($O_2$) sensor exploits tris(4,7-diphenyl-1,10-phenanthroline)ruthenium(II) ($[[Ru(dpp)_3]^{2+}]$) as the luminophore encapsulated in a xerogel thin-film. Assuming all the luminophore molecules in the xerogel thin-film are equally accessible to the analyte $O_2$ molecules, then Equation (1) below, known as the Stern-Volmer equation, describes the relationship between the $O_2$ concentration and the luminophore quenching induced by the $O_2$:

$$\frac{I_0}{I} = \frac{\tau_0}{\tau} = 1 + Ksv[O_2] = 1 + K_q\tau_0[O_2] \quad (1)$$

$$\tan(\theta) = (2\pi \times f) \cdot \tau \quad (2)$$

where $I_0$ and $\tau_0$ are the luminescence intensity and lifetime in the absence of $O_2$ respectively, $I$ and $\tau$ are the intensity and lifetime in the presence $O_2$ respectively, Ksv is the Stern-Volmer constant, $k_q$ is the bimolecular quenching constant and $[O_2]$ is the fractional $O_2$ concentration.

As such the concentration can be measured based upon a measurement of lifetime which is presented as the phase shift in the frequency domain between the reference (excitation) signal and resulting luminescence signal as described in Equation (2). Hence, the luminophore is excited by sinusoidal modulated light source with a frequency, and the luminescence is at the same frequency but is phase shifted by $\theta$. The phase shift being dependent on the excited state lifetime, $\tau$, as shown in Equation (2). Accordingly based upon Equations (1) and (2), concentration can be obtained by simply measuring the phase shift with an electronic circuit. Accordingly therefore an electronic circuit that provides the excitation signal at frequency f to an optical source, receives the phase shifted measurement signal at frequency from the optical detector, and determines the phase in conjunction with an optical source providing excitation of the luminophore, a filter to allow only the luminescence signal to pass, and an optical detector provides for measurements of a wide range of luminophores and the associate analytes thereby.

Further it would be beneficial to provide an electronic circuit that does not require one circuit for each source—sensor—detector combination but rather was compatible with a optical source—N sensor—X filter—M detector architecture, where M≥N and X=N|M. Where M>N this implies multiple detectors per sensor, i.e. allowing redundancy of detectors. Associating N sensors to an optical source further provides for a reduction in cost through minimizing the number of more expensive, typically, ultraviolet optical emitters and reducing the number of optical coupling systems between the optical emitter and sensor array. Where multiple detectors are associated with one or more sensors and the emission wavelengths of the fluorescent materials in the sensors emit within the absorption window of a detector then multiple detectors may form part of a multi-element sensor. Typical detector materials include silicon (Si), germanium (Ge), indium gallium arsenide (InGaAs), and gallium phosphide (GaP) which may be provided as discrete photodetectors, multi-element detectors, and charge-coupled devices (CCDs) for example.

According to embodiments of the invention a low cost electronic circuit is provided which allows low cost fluorescent based sensors and sensor arrays to be implemented. The electronic circuit allows multiple fluorescent based sensors to be read and measurements of their associated analytes made with a single optical source.

SUMMARY OF THE INVENTION

It is an object of the present invention to address limitations in prior art sensors and more particularly to fluorescence based sensors exploiting xerogels.

In accordance with an embodiment of the invention there is provided a method comprising:
providing an optical excitation source emitting over a first predetermined wavelength range and capable of analog modulation over a predetermined frequency range;
providing a sensor comprising a gel substrate incorporating within its matrix a receptor for molecular recognition of an analyte and a luminophore for signaling a recognition event relating to the analyte, the luminophore emitting an optical signal over a second predetermined wavelength range;
providing a detection circuit comprising an optical detector for receiving the optical signal emitted by the luminophore and generating a photocurrent in dependence thereof;
providing an excitation circuit for generating an analog signal for modulating the optical excitation source in dependence upon a digital control; and
providing a read circuit for receiving the photocurrent and generating a digital output, the digital output generated in dependence upon the phase difference between the received photocurrent and the generated analog signal.

In accordance with an embodiment of the invention there is provided a device comprising:

an optical excitation source emitting over a first predetermined wavelength range and capable of analog modulation over a predetermined frequency range;

a sensor comprising a gel substrate incorporating within its matrix a receptor for molecular recognition of an analyte and a luminophore for signaling a recognition event relating to the analyte, the luminophore emitting an optical signal over a second predetermined wavelength range;

a detection circuit comprising an optical detector for receiving the optical signal emitted by the luminophore and generating a photocurrent in dependence thereof;

an excitation circuit for generating an analog signal for modulating the optical excitation source in dependence upon a digital control; and a read circuit for receiving the photocurrent and generating a digital output, the digital output generated in dependence upon the phase difference between the received photocurrent and the generated analog signal.

In accordance with an embodiment of the invention there is provided a circuit comprising:

an excitation circuit for generating an analog signal for modulating an optical excitation source in dependence upon a digital control; and a read circuit for receiving a photocurrent and generating a digital output, the digital output generated in dependence upon the phase difference between the received photocurrent and the generated analog signal.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

The present invention is directed to sensors and more particularly to fluorescence based sensors exploiting gels.

Within the following description reference may be made below to specific elements, numbered in accordance with the attached figures. The discussion below should be taken to be exemplary in nature, and not as limiting the scope of the present invention. The scope of the present invention is defined in the claims, and should not be considered as limited by the implementation details described below, which as one skilled in the art will appreciate, can be modified by replacing elements with equivalent functional elements or combination of elements. Within these embodiments reference will be made to terms which are intended to simplify the descriptions and relate them to the prior art, however, the embodiments of the invention should not be read as only being associated with prior art embodiments.

Within this specification fluorescence is referred to in the background, summary of the invention and detailed description. It would be evident to one skilled in the art that fluorescence is one form of luminescence exhibited by atom or atomic grouping in a chemical compound, a luminophore. Accordingly, the embodiments of the invention should not be considered as restricted to fluorescence only.

Within this specification xerogel is referred to in the background, summary of the invention and detailed description. It would be evident to one skilled in the art that a xerogel is one form of gel allowing the inclusion/attachment of a fluorescent sensor material, a luminophore, to the gel together with the inclusion/attachment of a capture material for an analyte. Such capture material may for example be a luminophore, an enzyme, an antibody, and an aptamer. Accordingly, embodiments of the invention should not be considered as restricted to xerogels only but may include other materials including for example sol-gels, aerogels, hydrogels, and organogels.

Figure 1:
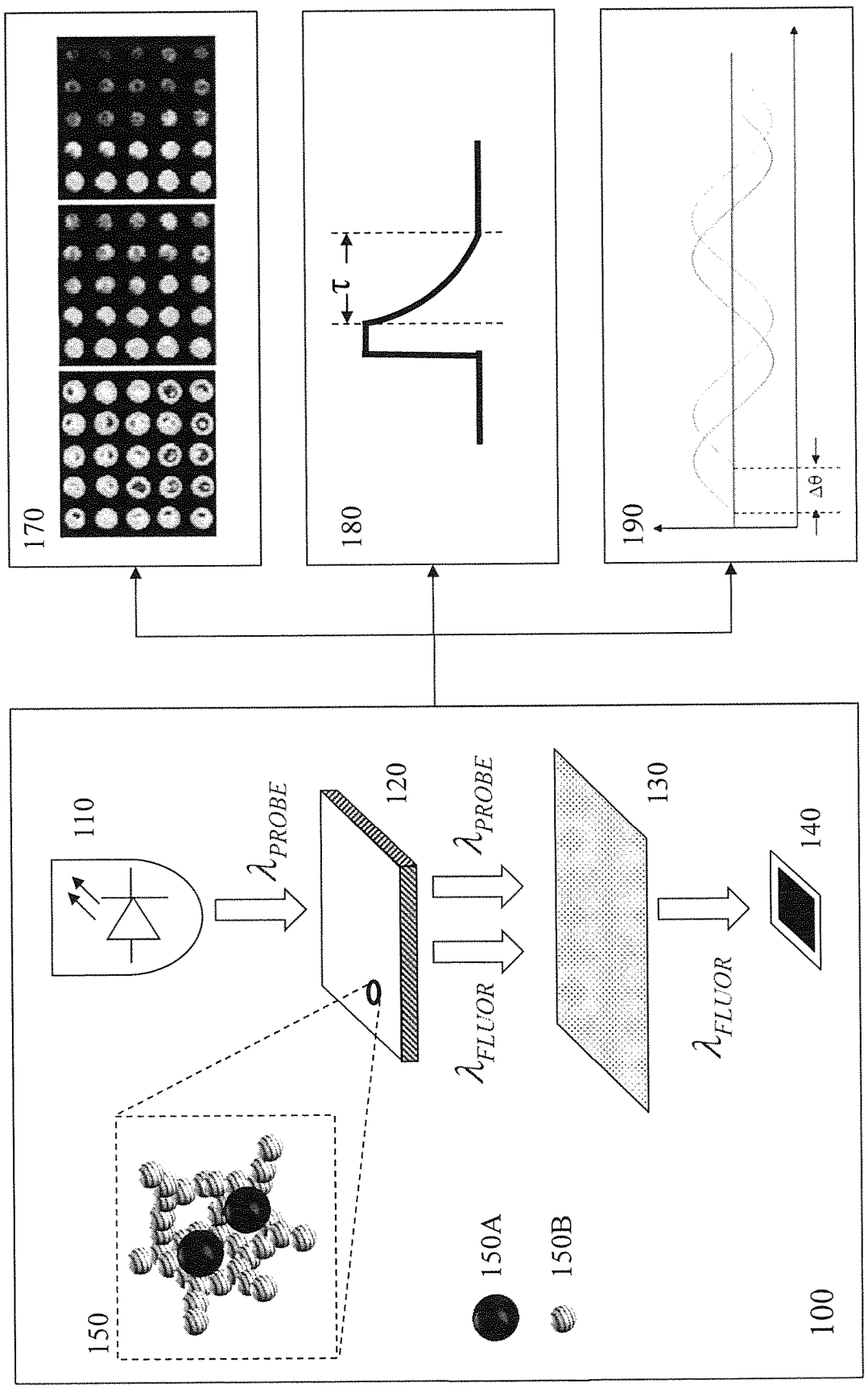
FIG. 1 depicts a system schematic for luminescence based sensing.

Referring to FIG. 1 there is depicted a schematic of a system 100 for luminescence based sensing. System 100 comprises an optical source 110 that emits a probe wavelength $\lambda_{PROBE}$ to a sensor substrate 120 that contains fluorescent probe 150 comprising fluorescent material 150A immobilized to capture molecules 150B that form part of the sensor substrate 120. The fluorescent probes emit at an emission wavelength $\lambda_{FLUOR}$ wherein the characteristics of the emission from the fluorescent material 150A are modified by the presence of an analyte associated with the capture molecules 150B. The degree of modification being based upon the quantity of analyte. The remaining probe wavelength $\lambda_{PROBE}$ and emission wavelength $\lambda_{FLUOR}$ propagate to a filter 130 wherein only the emission wavelength $\lambda_{FLUOR}$ propagates to photodetector 140.

According to one configuration of the system 100 the photodetector 140 provides a luminescence image 170, i.e. photodetector 140 is a CCD imaging device. In another the signal from photodetector 140 is characterized to establish a characteristic of the signal such as a time constant in time domain measurement 180. In another embodiment the signal from photodetector 140 is characterized to establish a characteristic of the signal such as the phase of the signal from the photodetector relative to the excitation signal applied to the optical source 110 in phase measurement 190.

Figure 2:
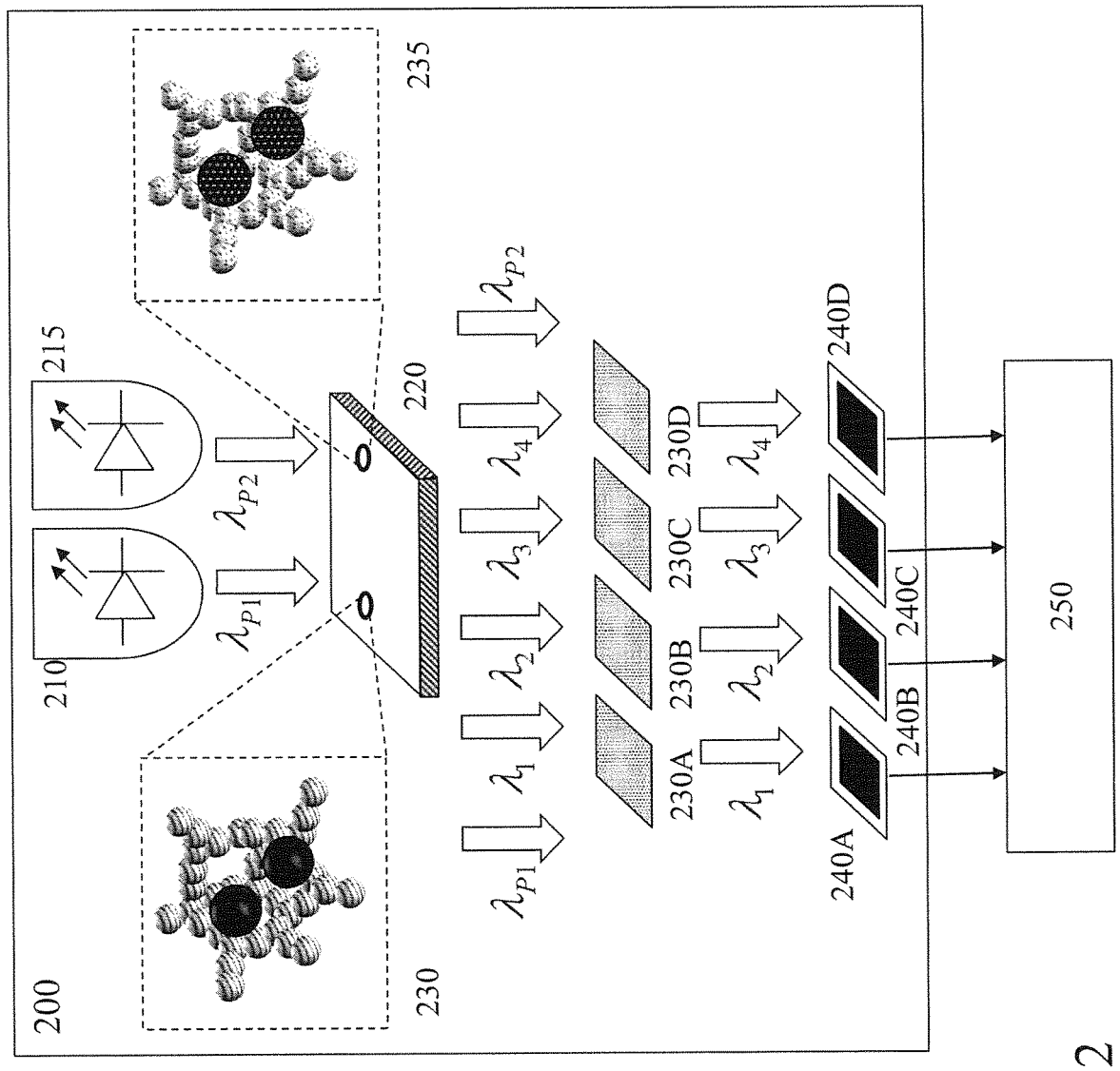
FIG. 2 depicts a system schematic for multiple probe multiple sensor based luminescence based sensing.

Referring to FIG. 2 there is depicted a schematic of a system 200 for luminescence based sensing. System 200 comprises first and second optical sources 210 and 215 that emit at probe wavelengths $\lambda_{P1}$ and $\lambda_{P2}$ to a sensor plate 220 that contains first and second fluorescent probes 230 and 235 respectively that form part of a plurality of sensor materials comprising a fluorescent material immobilized to a capture material forming part of the sensor plate 220. Each of the plurality of fluorescent probes emits at a different emission wavelength, such as first to fourth fluorescent wavelengths $\lambda_1$ to $\lambda_4$ respectively as shown. For example first fluorescent wavelength $\lambda_1$ is associated with first fluorescent probe 230 and second fluorescent wavelength $\lambda_2$ is associated with second fluorescent probe 235.

The characteristics of emission from the fluorescent materials are modified by the presence of the analyte associated with the respective capture molecules that form part of each of the fluorescent probes. Accordingly, the emission of the first fluorescent wavelength $\lambda_1$ associated with first fluorescent probe 230 and second fluorescent wavelength $\lambda_2$ associated with second fluorescent probe 235 is modified by the quantity of their respective analytes.

The remaining probe wavelengths $\lambda_{P1}$ and $\lambda_{P2}$ and first to fourth fluorescent wavelengths $\lambda_1$ to $\lambda_4$ to propagate to filter array comprising first to fourth filters 230A through 230D which are associated with first to fourth photodetectors 240A through 240D wherein only the associated emission wavelength of the associated filter propagates to that photodetector. For example first photodetector 240A receives $\lambda_1$ as a result of the filtering from first filter 230A. The output signals from first to fourth photodetectors 240A through 240D are coupled to measurement circuit 250.

Figure 3:
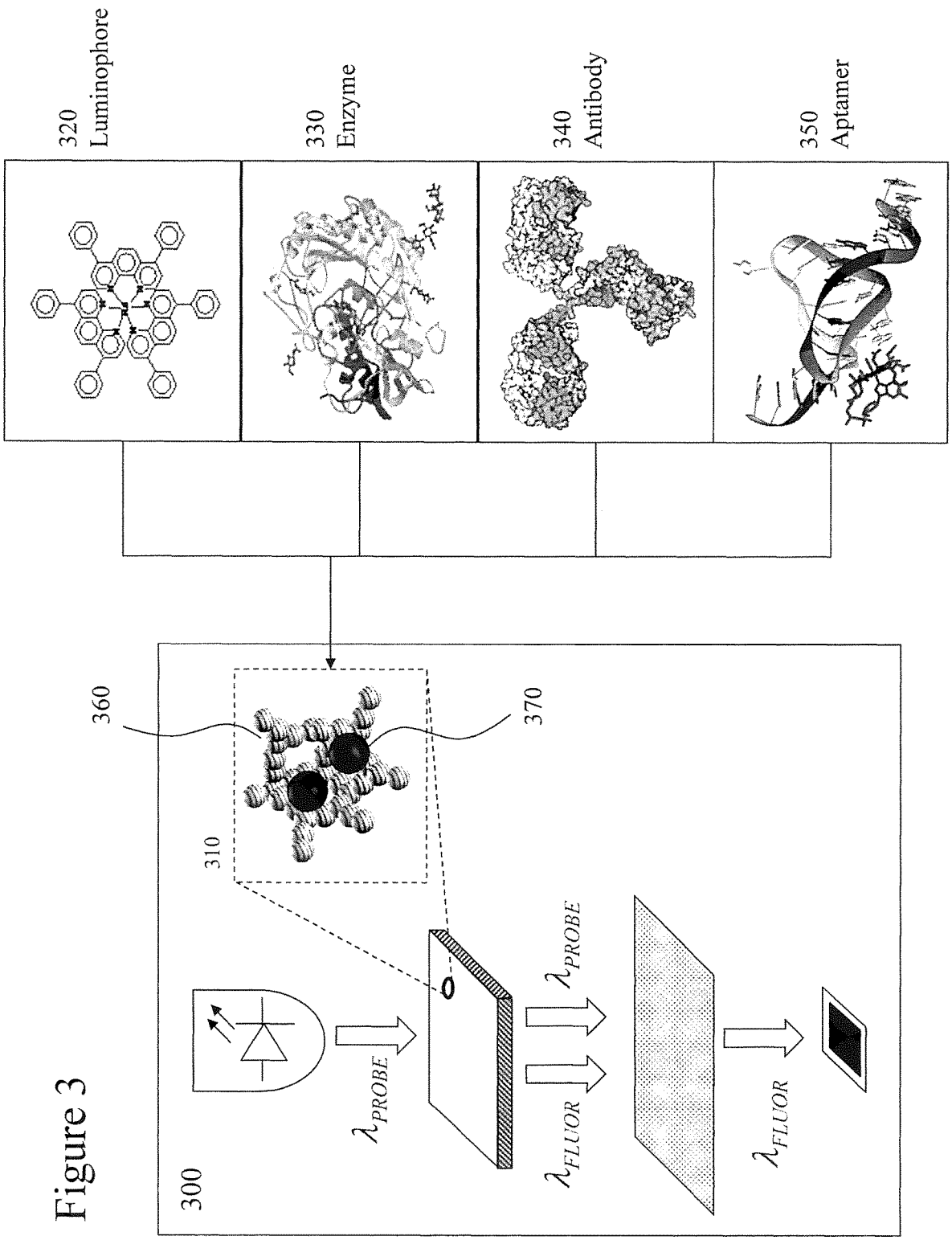
FIG. 3 depicts sensor types for luminescence based sensing.

Now referring to FIG. 3 there is depicted luminescence system 300 comprising fluorescent sensor material 310 comprising a fluorescent material 370 immobilized to a capture material 360. According to the analyte being sensed capture material may be a luminophore 320, enzyme 330, antibody 340 or aptamer 350. In the case that the capture material is itself a luminophore 320 and hence luminescent itself the fluorescent material 370 may be omitted. Although in other instances wherein the luminophore 320 is more akin to a phosphor a fluorescent material 370 may be employed to shift the detection wavelength to a region away from the optical probe wavelength exciting the measurement system.

Considering, luminophore 320 then this can be divided into two subcategories: fluorophores and phosphors. The difference between luminophores belonging to these two subcategories is derived from the nature of the excited state responsible for the emission of photons. Some luminophores, however, cannot be classified as being exclusively fluorophores or phosphors and exist in the gray area in between. Such cases include transition metal complexes (such as ruthenium tris-2,2'-bipyridine for example) whose luminescence comes from an excited (nominally triplet) metal-to-ligand charge transfer (MLCT) state, but which is not a true triplet-state in the strict sense of the definition; and colloidal quantum dots, whose emissive state does not have either a purely singlet or triplet spin. Most luminophores consist of conjugated pi systems or transition metal complexes. In addition purely inorganic luminophores, such as zinc sulfide doped with rare earth metal ions, rare earth metal oxysulfides doped with other rare earth metal ions, yttrium oxide doped with rare earth metal ions, zinc orthosilicate doped with manganese ions, etc.

Enzymes 330, like catalysts, work by lowering the activation energy for a reaction, thus dramatically increasing the rate of the reaction. Enzymes are very selective and speed up only a few reactions, which given that enzymes are known to catalyze about 4,000 biochemical reactions, implies the number of potential enzymes available is large. A few RNA molecules called ribozymes also catalyze reactions, with an important example being some parts of the ribosome. Additionally, synthetic molecules called artificial enzymes also display enzyme-like catalysis adding to the pool of available capture molecules to operate in conjunction with the fluorescent material to establish optical activity in dependence of the process they are monitoring, controlling, or accelerating.

An antibody 340, also known as an immunoglobulin, is a large Y-shaped protein used by the immune system to identify and neutralize foreign objects such as bacteria and viruses. The antibody recognizes a unique part of the foreign target, termed an antigen. Though the general structure of all antibodies is very similar, the small region at the tip of the protein is extremely variable, allowing millions of antibodies with slightly different tip structures, or antigen binding sites, to exist. This region is known as the hypervariable region. Each of these variants can bind to a different target. Accordingly, there is enormous diversity in the antibodies which can be exploited.

Aptamers 350 are oligonucleic acid or peptide molecules that bind to a specific target molecule. Aptamers are usually created by selecting them from a large random sequence pool, but natural aptamers also exist in riboswitches. Aptamers can be used for both basic research and clinical purposes as macromolecular drugs. Aptamers can be combined with ribozymes to self-cleave in the presence of their target molecule. More specifically, aptamers can be classified as either DNA or RNA aptamers in that they consist of (usually short) strands of oligonucleotides or peptide aptamers in that they consist of a short variable peptide domains, attached at both ends to a protein scaffold.

Accordingly, a wide range of materials can be employed as capture material and bound to a substrate such as a xerogel allowing multiple sensing elements to be integrated with compact footprint and low cost. Whilst generally different capture materials would be employed for different analytes it would be evident that multiple capture materials may be employed for a single analyte, such as for example to provide an increased dynamic range of measurement than is achievable with a single capture material.

Figure 4A:
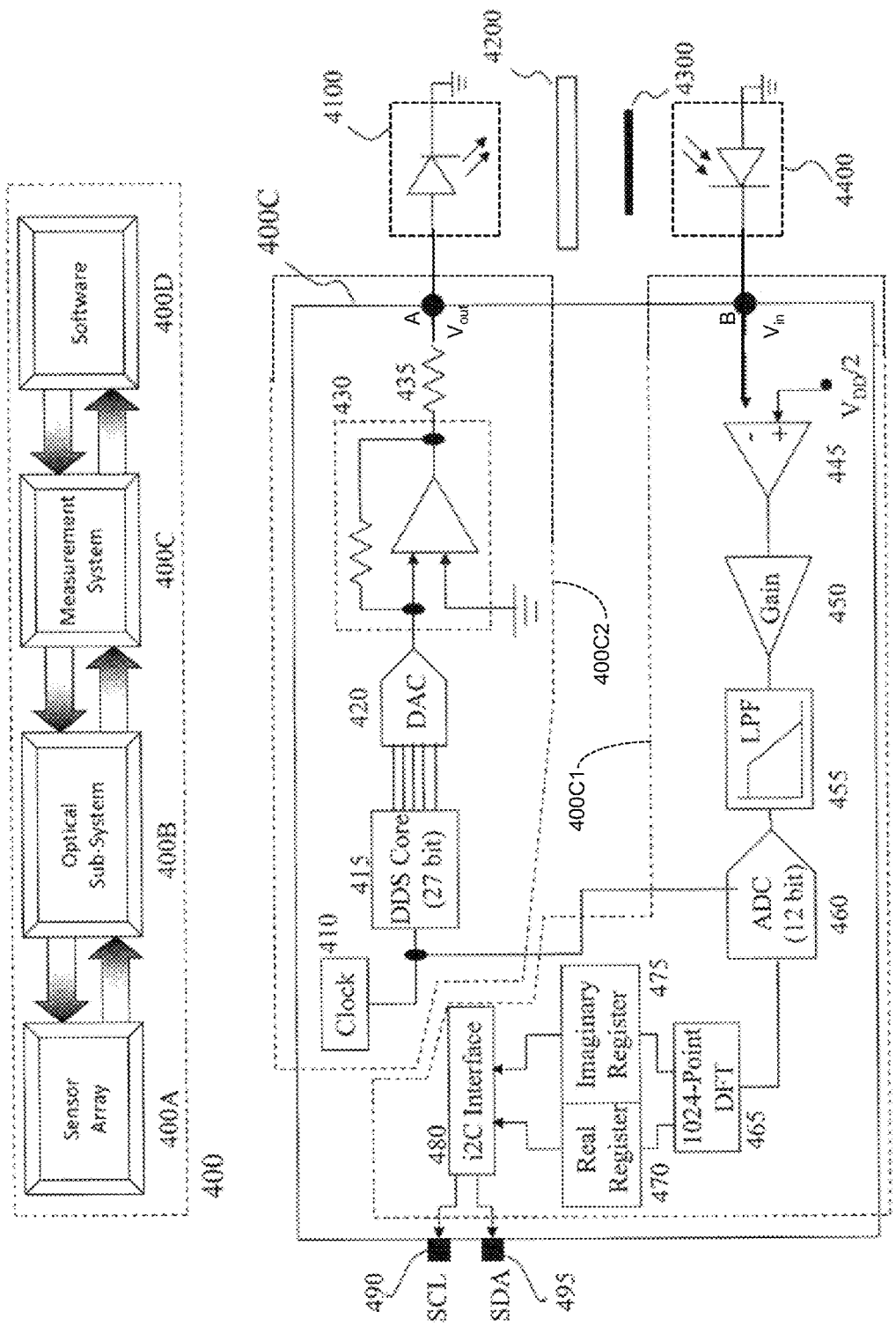
FIG. 4A depicts an electronic measurement circuit for luminescence based sensing according to an embodiment of the invention.

Now referring to FIG. 4A there is depicted a block diagram of a high-throughput miniaturized fluorescent sensor system (HMFSS) 400 according to an embodiment of the invention. As depicted the HMFSS 400 comprises four elements, the first being Sensor Array 400A which acts as the sensor element and communicates bi-directionally with the second element, an Optical Sub-System 400B. The Optical Sub-System 400B is then bi-directionally connected to the third element, namely the Measurement System 400C, wherein the output of the impedance Measurement System 400C is provided to the fourth element, software 400D. Software 400D, which may also provide control information to the Measurement System 400C, converts the digitally converted sensor reading obtained for each element in the Sensor Array 400A to a measurement for reporting through a user-interface or via a network to a remote system monitoring the HMFSS 400.

Also shown in FIG. 4A is the third element of the HMFSS 400, the Measurement System 400C, which comprises electronic excitation circuit 400C1 and electronic read circuit 400C2. The electronic excitation circuit 400C1 provides the $V_{OUT}$ signal to the Optical Sub-System 400B, represented by LED 4100, filter 4300 and photodetector 4400 that couple to and from a sensor 4200. The $V_{OUT}$ signal being characterized by an amplitude and a frequency. The electronic excitation circuit 400C1 begins with a clock 410 which is coupled to a direct digital synthesizer 415. In this embodiment, the direct digital synthesizer 415 is a direct digital synthesis core (DDS Core) 415 which operates with 27 bits. The output of DAC 420 is coupled to inverter amplifier stage 430 which provides the required amplitude for the sinusoidal output generated by the DDS Core 415 and DAC 420. The output of the inverter amplifier stage 430 is coupled via resistor 435 to the output port of the electronic excitation circuit 400C1 and is used to drive the LED 4100. According to the requirements of the LED 4100, the analog modulation $V_{OUT}$ provided by the electronic excitation circuit 400C1 of the Measurement System 400C may be offset with a predetermined bias voltage established through the control settings for the DDS core 415 or combined with a bias voltage through a bias-T, not shown for clarity. It will be understood that the electronic excitation circuit 400C1 may also be equivalently referred to as signal generator 400C1 herein. Similarly, the electronic read circuit 400C2 may also be equivalently referred to as signal measurement 400C2 herein.

Accordingly, the LED 4100 provides an amplitude modulated optical signal to the sensor 4200 wherein fluorescence emitted from the sensor 4200 is then filtered by filter 4300 and coupled to the photodetector 4400.

The electronic read circuit 400C2 of the Measurement System 400C receives the photo-generated signal from the photodetector 4400 coupled to the $V_{IN}$ port of the electronic read circuit 400C2 of the Measurement System 400C wherein it is amplified by differential amplifier 445 which is referenced to a predetermined voltage, depicted as $V_{DD}/2$. The output of the differential amplifier 445 is coupled to a gain stage 450 and is then fed to a low pass filter 455 and thereafter to a 12-bit ADC 460. The output of the 12-bit ADC 460 is coupled back to the input of the DDS Core 415 where it is combined with the clock 410. From the output of the 12-bit ADC 460 the digitized and filtered signal from the electrode element 480 is fed to a digital Fourier Transform (DFT) processor 465 (e.g., a 1024 point DFT processor) wherein the outputs from this are coupled to a Real register 470 and Imaginary register 475 which is storing the real and imaginary components of the impedance at the applied frequency of the $V_{OUT}$ signal, i.e. is measured. The Real register 470 and Imaginary register 475 are coupled to an Inter-Integrated Circuit (I2C or 12C) interface 480. The outputs from the I2C interface 480 being Serial Clock Line 490 and Serial Data Line (SDA) 495 are then the outputs from the Measurement System 400C.

It would be evident to one skilled in the art that the amplitude and frequency of $V_{OUT}$ provided by the electronic excitation circuit 400C1 may be fixed, variable, or swept according to characteristics of the sensor(s) 4300. In the instance that the signal is swept according to the overall control of the HMFSS 400 this may be between a lower frequency and an upper frequency with a predetermined number of points per decade. Alternatively, the signal may be stepped through a predetermined sequence of output signals wherein each signal is tailored to the characteristics of a sensor within a sensor array.

Figure 4B:
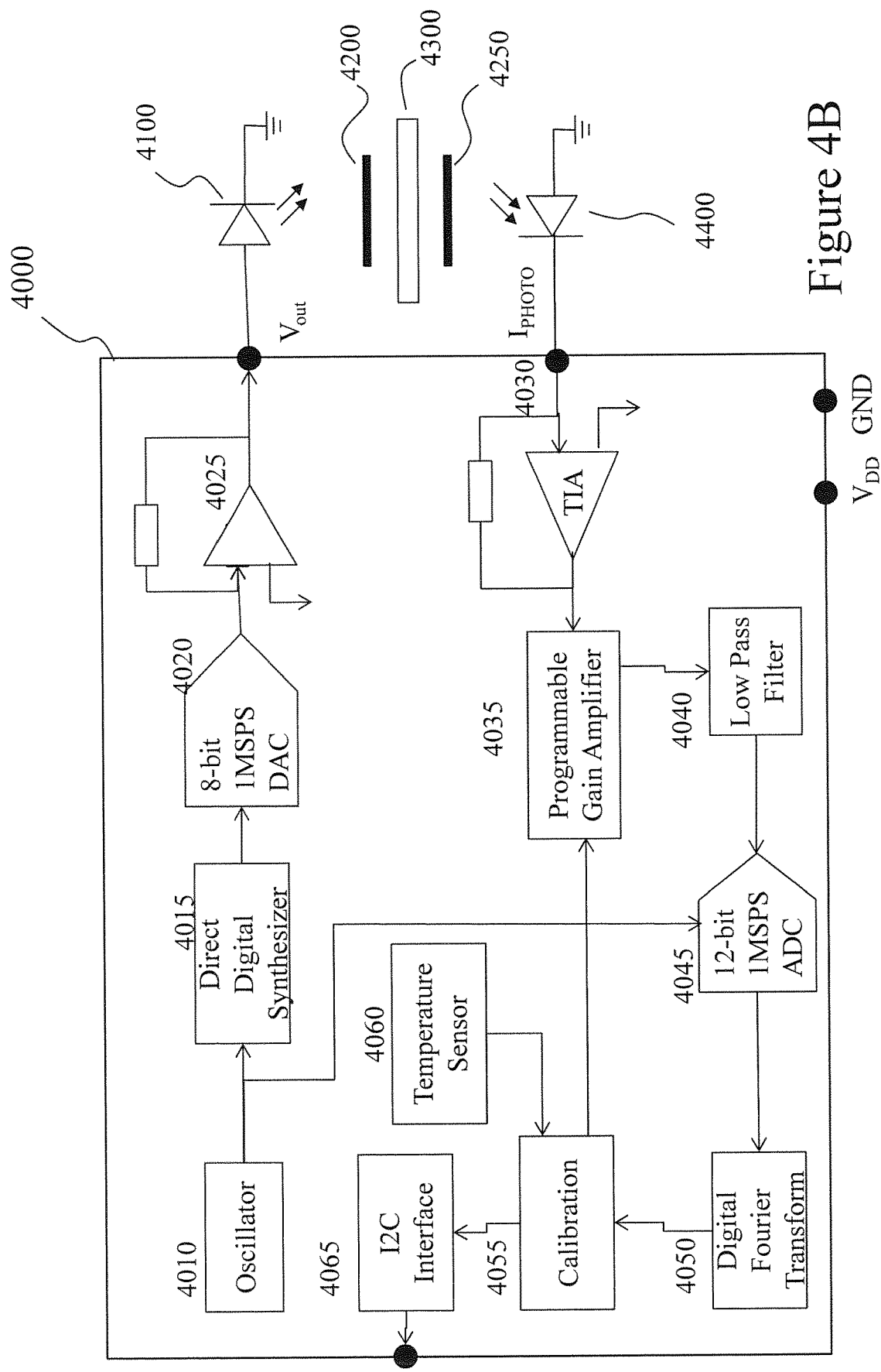
FIG. 4B depicts an electronic measurement circuit for luminescence based sensing according to an embodiment of the invention.

Now referring to FIG. 4B there is presented Measurement Sub-System (MSS) 4000 according to an embodiment of the invention. Accordingly an optical source 4100 is provided with an oscillating drive signal, $V_{OUT}$ at frequency f, generated by a Direct Digital Synthesizer 4015 which is driven from an oscillator 4010 and converted to an analog signal via 8-bit 1MSPS DAC 4020 and amplifier 4025. The emitted optical signal from the optical source 4100 is filtered by first filter 4200 before impinging on sensor substrate 4300 wherein luminophores that form part of sensor substrate 4300 are excited into an excited state before relaxing back with emission of luminescent signals at a longer wavelength. These are filtered by second filter 4250 such that only emitted luminescent signals are coupled to the optical detector 4400. Accordingly a photocurrent at frequency f is generated.

This photocurrent is amplified by transimpedance amplifier (TIA) 4030 before being coupled via programmable gain amplifier 4035 and low pass filter 4040 to 12-bit 1MSPS ADC 4045. The output of ADC 4045 is coupled to a digital Fourier transform 4050 and thence to calibration block 4055 which also receives a temperature signal from temperature sensor 4060. The resulting compensated and converted output is then coupled from the MSS 4000 via I2C Interface 4065.

According to an embodiment of the invention the digital Fourier transform 4050, calibration 4055, and Direct Digital Synthesizer 4015 are implemented using Digital Signal Processing (DSP) using on-chip ARM Cortex™ M3 processor and DSP core in Programmable System-on-Chip (PSoC), PSoC5. The remaining elements apart from the temperature sensor are mixed signal and analog circuit components that are available within the PSoC® 5 process. PSoC® 5 provides a true system-level solution providing microcontroller unit (MCU), memory, analog, and digital peripheral functions in a single chip. An example of such a chip being the CY8C55 from Cypress Semiconductor.

Figure 5:
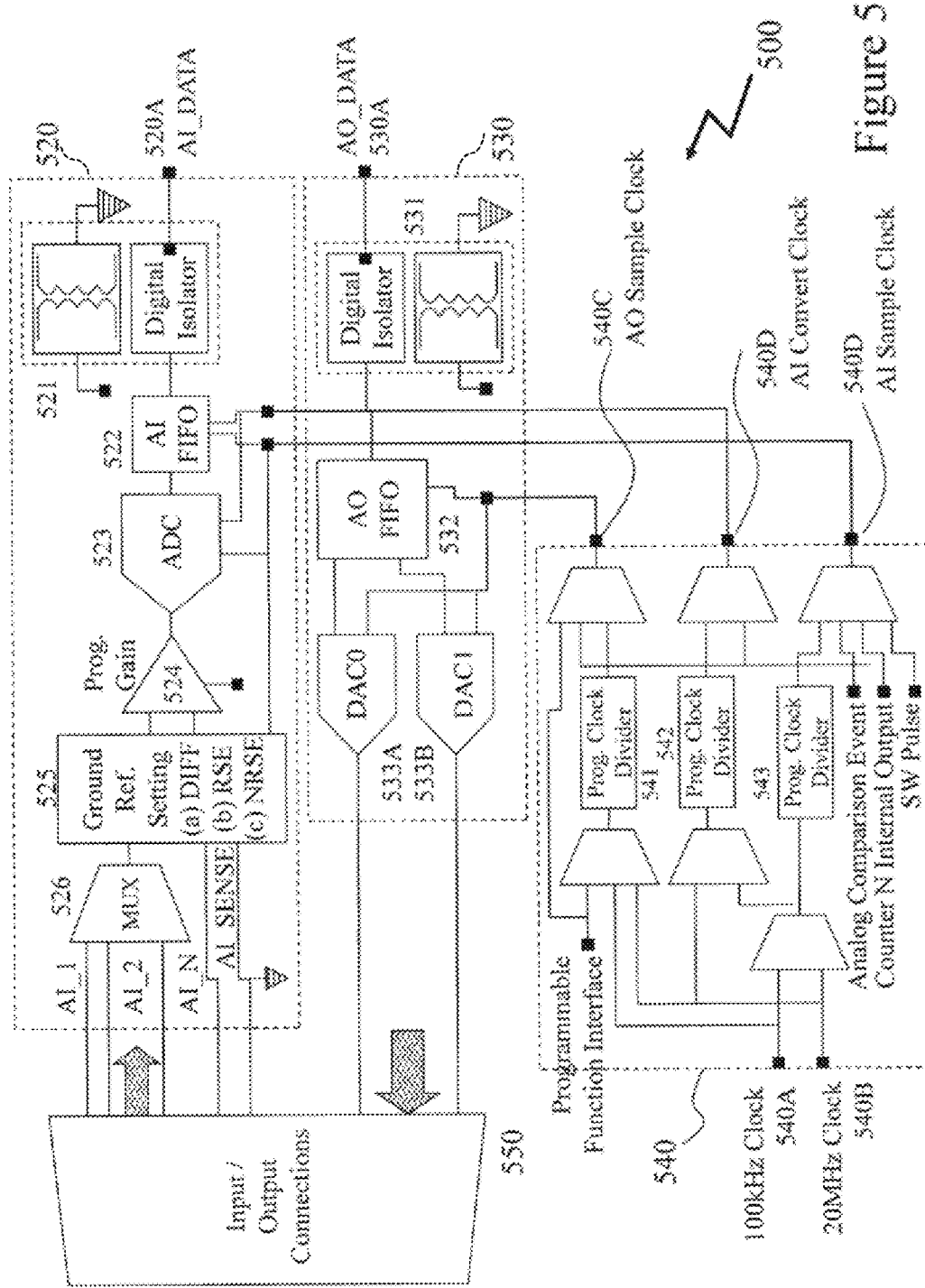
FIG. 5 depicts an electronic measurement circuit for luminescence based sensing with multiple sensor outputs associated with common optical source according to an embodiment of the invention.

Now referring to FIG. 5 there is depicted an embodiment of a programmable excitation circuit and measurement circuit (PECMC) 500 for a HMFSS 400. As such the PECMC 900 forms a potential embodiment for the Measurement System 400 coupled to an optical source, such as LED 4100 in FIG. 4A, addresses multiple sensors, such as sensor 4200 in FIG. 4A, thereby generating multiple outputs from multiple optical photodetectors, such as photodetector 4400 in FIG. 4A. The PECMC 500 comprises a electronic excitation circuit 520, an electronic read circuit 530 and a clock circuit 540, the latter of which being external to the electronic excitation circuit 520 in this specific embodiment. Considering firstly the clock circuit 540 then this receives a first clock at first port 540A and a second clock at second port 540B. These are employed by clock circuit 540 in conjunction with first, second, and third programmable clock dividers 541 through 543 respectively to generate an analog output sample clock provided from third port 540C, an analog input convert clock from fourth port 540D, and analog input sample clock from fifth port 540E. It will be understood that the electronic excitation circuit 520 may also be equivalently referred to as analog input section 520 herein. Similarly, the electronic read circuit 530 may also be equivalently referred to as analog output section 530 herein.

The analog output sample clock is coupled from third port 540C to analog output FIFO 532, first DAC 533A and second DAC 533B within the electronic read circuit 530. Each of the first and second DACs 533A and 533B respectively also receive an output from the analog output FIFO 532. The input to the analog output FIFO 532 is coupled from the AO_DATA port 530A of the electronic read circuit 530 via digital isolator circuit 531. The outputs from the first and second digital-to-analog converters (DACs) 533A and 533B respectively being coupled to an input/output connection block 950 and being first and second output signals AO_0 and AO_1 respectively.

The analog input convert clock and analog input sample clock are coupled from the fourth and fifth ports 540D and 540E respectively to an analog input FIFO 522 and analog-to-digital converter (ADC) 522 of the electronic excitation circuit 520. The output of ADC 522 is also coupled to the analog input FIFO 522, and a ground reference setting circuit 525. The output of the analog input FIFO 522 is coupled to the AI_DATA port 520A of the electronic excitation circuit 520 via digital isolator 521. The ADC 522 is further coupled to, and receives a signal to be converted, from programmable gain stage 524 which receives its inputs from ground reference setting circuit 525, and are generated in dependence of the signal received from the multiplexer (MUX) 526 in conjunction with AI_SENSE and ground signals received from the input/output connection block 550. MUX 926 similarly receives signals from the input/output connection block 950, these being the N signals to be measured on lines AI_1, AI_2, . . . , AI_N.

Accordingly the electronic read circuit 530 provides the AC excitation signal to the Optical Sub-System 400B. The photodetector array measurements within Optical Sub-System 400B are therefore to the lines AI_1, AI_2, . . . , AI_N from the input/output connection block 550 and therein to the MUX 526. Accordingly these lines are sampled and converted within the analog input section 920 as determined under the clocks generated by the clock section 540. The sampled and converted signals are then provided to the AI_DATA port 520A from the electronic excitation circuit 520. In this manner the PECMC 500 acts as the Measurement System 420 of the HMFSS 400 for multiple sensors with a common optical source. As the PECMC 500 has to only determine phase of the received signal relative to the excitation signal the samples for each optical detector need not be more than one cycle as phase shifts of more than ±360° cannot be unambiguously determined.

It would be apparent to one skilled in the art that the electronic excitation circuit 520 and the electronic read circuit 530 are both synchronized to the same master clocks, being the first and second clocks provided to first and second ports 540A and 540B respectively of clock circuit 540. According to one potential embodiment the first clock being 100 kHz and the second clock being 20 MHz and the Measurement System 400C, as presented by PECMC 500, may provide AO_0 and AO_1 as 16-bit 250 kS/s analog output channels with an amplitude of ±3V using Analog Devices ADG766 16 bit 390 kS/s DACs for first and second DACs respectively. The frequency of the analog output channels, implementing the analog driving signal to the optical source(s) being determined by the maximum sample clock rate of the second clock provided to the clock section 540 of the PECMC 500 and the desired number of samples per each cycle. Additionally the phase of these signals is set to be zero. The waveform for each of the analog output channels, such as AO_0, is generated based upon the parameters such as amplitude, offset, frequency, phase, number of samples per buffer and number of cycles per buffer, the data being buffered for example in memory associated with the Measurement System 400C and not shown for clarity in the preceding figures.

To efficiently generate the excitation signal and to ensure that memory buffers do not overflow, the samples per channel may be limited to say 4096 and/or the number of samples per buffer may be programmed such that for low frequencies the number of samples is more and for high frequencies number of samples is less. The waveform parameters such as frequency along with the number of samples per buffer and number of signal cycles per buffer determine other parameters given by equations (3) and (4) below:

$$Clk_{Desired} = \frac{f * S_{buffer}}{C_{buffer}} \quad (3)$$

$$S_{cycle} = \frac{S_{buffer}}{C_{buffer}} \quad (4)$$

where $Clk_{Desired}$ is the desired sample clock rate, f is the frequency of the excitation signal, $S_{buffer}$ is the samples per memory buffer, $C_{buffer}$ is the cycles per memory buffer, and $S_{cycle}$ is the number of samples per cycle.

Similarly, Measurement System 400C as presented by PECMC 400, may be implemented with a sampling of 16 bits for AI_x analog channel with a sampling rate of 250 kS/s using a low cost commercial ADC circuit, for example those provided by Analog Devices. Maxim, National Semiconductor and Linear Technology using Successive Approximation Register (SAR) ADC and Pipelined ADC architectures according to speed, accuracy, cost, and power requirements. As PECMC 500 within the exemplary embodiment of FIG. 5 supra employs a single ADC with a multiplexer to lower overall costs there is a propagation delay between the two input channels, which relates to the applied signal, and AI_0 which AI_x relates to the $x^{th}$ analog input line. This propagation delay results in an additional phase offset between the signals which can adversely affect the AC analysis of the signals and therefore needs to be compensated for. This requires recognizing that the propagation delay that has been introduced is determined by the sampling rate of the device and then calculating the expected phase offset due to the propagation delay at the required frequency is given by equation (5) below:

$$\Phi_{offset} = (R_{sample} * f) * 360 \quad (5)$$

where $\Phi_{offset}$ is the measurement induced phase offset, $R_{ref}$ is the sampling rate of the device, and f is the frequency of the excitation signal.

After this input multiplexing and ADC conversion the digital isolated signal is provided at the output of the electronic excitation circuit 520 as AI_DATA, whereupon it is provided to the final stage of the HMFSS 400, namely the Software 400D. Within the Software 400D this sampled, digitized analog signal representative of the impedance of the electrode being measured is converted to an impedance measurement.

It would be apparent to one skilled in the art that where the HMFSS 400 is addressing measurements wherein there is negligible dynamic variation and that whilst the primary concern is speed of measurements other factors such as replacement of assay trays containing measurement sites exist that even 250 kS/s sampling/excitation may be more than sufficient. Alternately in other applications with dynamic monitoring it would be apparent that 250 kS/s may be either over-measuring or under-measuring the measurements sites. Hence it is apparent that alternate implementations of the embodiments of the invention may be possible to address such issues simply by either replacing the first and second DACs 533A and 533B respectively, replacing the ADC 523, or both. Such replacements adjusting the cost of implementation according to whether sampling rates are reduced, for example to 100 kS/s, or whether they are increased to rates of 1 MS/s, 10 MS/s for example.

It would be evident further that with multiple sources including for example Maxim, Analog Devices, Linear Technology, National Semiconductor, Fairchild Semiconductor, NEC, Mitsubishi Corporation, Sony, Texas Instruments etc that DACs 533A and 533B need not be supplied by the same supplier as ADC 523. Further in some instances where very high speed analysis may be required, such as in employing HMFSS 500 in evaluating chemical reactions, catalytic processes etc or biological processes that happen rapidly, sampling rates for the analog-to-digital interfaces may be increased to 100 MS/s or even 1 GS/s. Such flexibility in selection of these analog-to-digital interfaces allows HMFSS 400 systems to be tailored to the application and cost targets allowing the objective of lowering the cost of EIS systems against current prior art commercial systems by orders of magnitude to be achieved.

In most instances within the range of 100 kS/s to 10 MS/s evaluating supplier options for the HMFSS 400 has been considered as being implemented with 16-bit accuracy devices for the DAC/ADC cost element of the Bill of Materials (BoM), resulting in costs well below $50 in most instances. It would also be apparent that in applications where testing is geared to more basic positive/negative determinations that accuracy may in those instances be traded for cost and lower accuracy DAC/ADC elements, e.g. 4-bit, 8-bit, may be employed thereby further reducing the BoM. Equally in some instances increasing accuracy may be beneficial wherein suppliers, albeit with reduced range of products, offer DAC/ADC elements with 24-bit accuracy.

Figure 6:
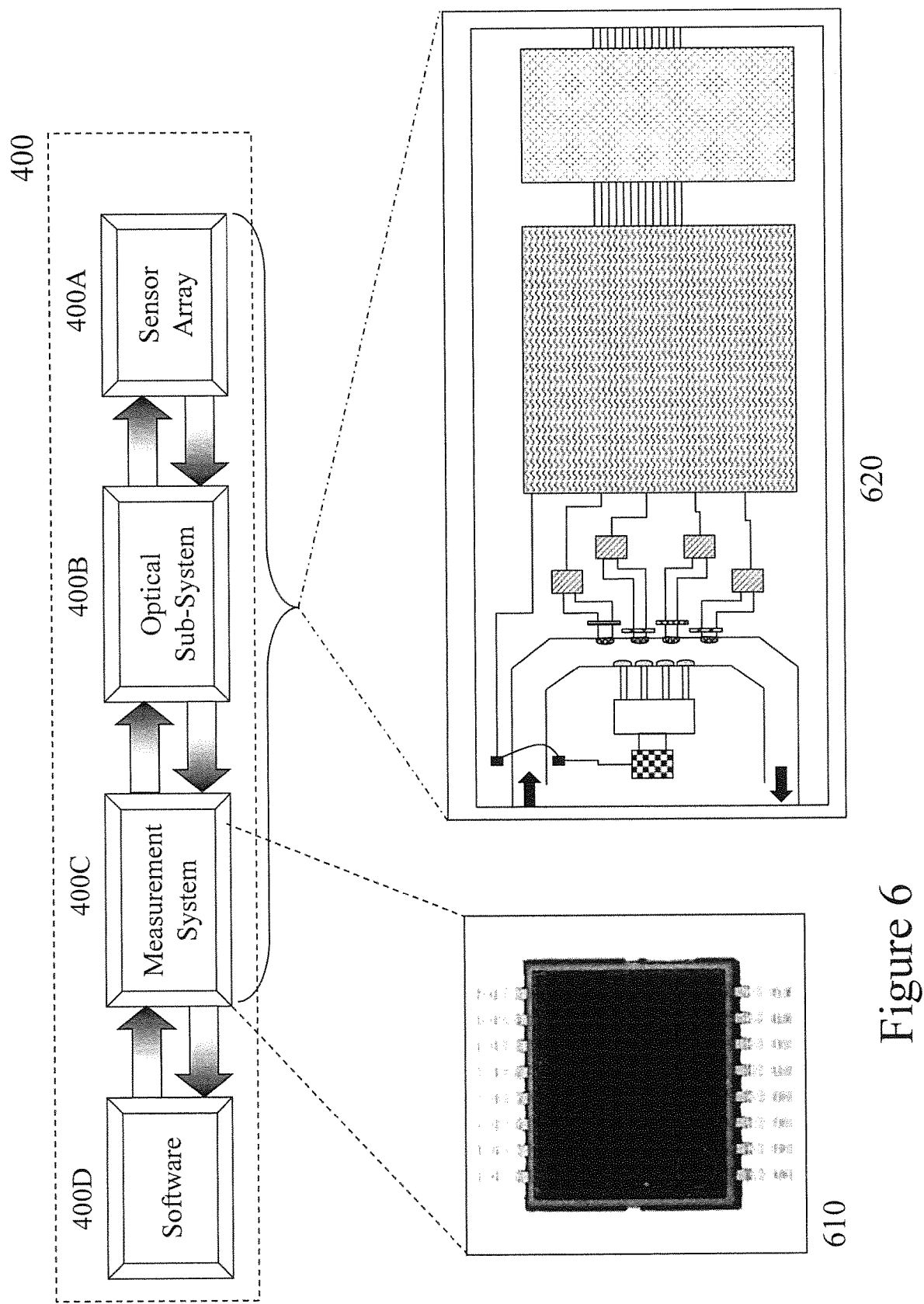
FIG. 6 depicts partitioning a luminescence based sensing system based upon implementing electronic measurement circuits according to embodiments of the invention.

Now referring to FIG. 6 there are depicted partitioning approaches for a luminescence based sensing system, such as HMFSS 400, based upon implementing the electronic measurement circuits according to embodiments of the invention. Accordingly, first partition 610 depicts the Measurement System 400C as being an integrated circuit wherein all circuit elements, such as presented above in respect of Measurement System 400C in FIG. 4A, MSS 4000 in FIG. 4B or PECMC 500 in FIG. 5 are provided. Such first partition 610 may according to the performance—cost tradeoffs required in the overall HMFSS 400 be for example a monolithic CMOS silicon integrated circuit, a hybrid circuit or a multi-chip module (MCM).

Second partition 620 depicts a higher level of integration wherein the Measurement System 400C, Optical Sub-System 400B and Sensor Array 400A. Second partition 620 being described in more detail in FIG. 8 below. However, due to the ability of silicon to house CMOS circuits, be micromachined to form microfluidic channels and support hybrid integration through flip-chip mounting optical elements etc, such high functional integration can be provided at low cost in high volumes as suits many applications of sensors in consumer applications or disposable medical applications.

Figure 7:
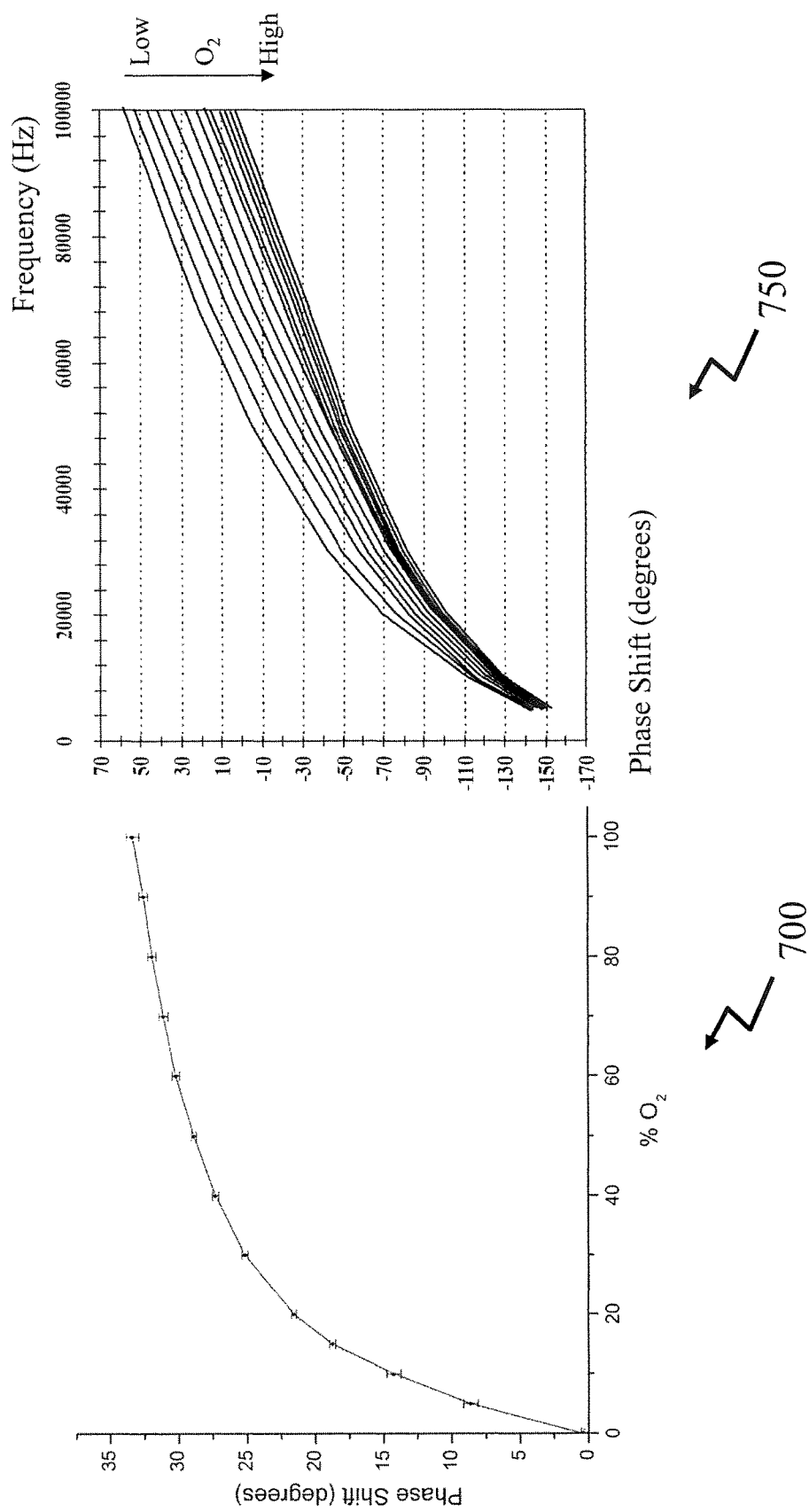
FIG. 7 depicts oxygen sensor results obtained with a luminescence based sensing system based upon implementing an electronic measurement circuit according to an embodiment of the invention.

FIG. 7 depicts oxygen sensor results obtained with a luminescence based sensing system based upon implementing an electronic measurement circuit according to an embodiment of the invention. First graph 700 depicts the measured phase shift in the received signal from the photodetector relative to the signal provided to the optical source as a function of oxygen concentration. Second graph 750 plots the phase shift at varying concentration levels for oxygen versus frequency of the signal applied to the optical source. Accordingly, it would be evident to one skilled in the art that a sensor system such as HMFSS 400 according to embodiments of the invention may use discrete measurements, multiple measurements or swept measurements to determine the measurement for the analyte in question.

Figure 8:
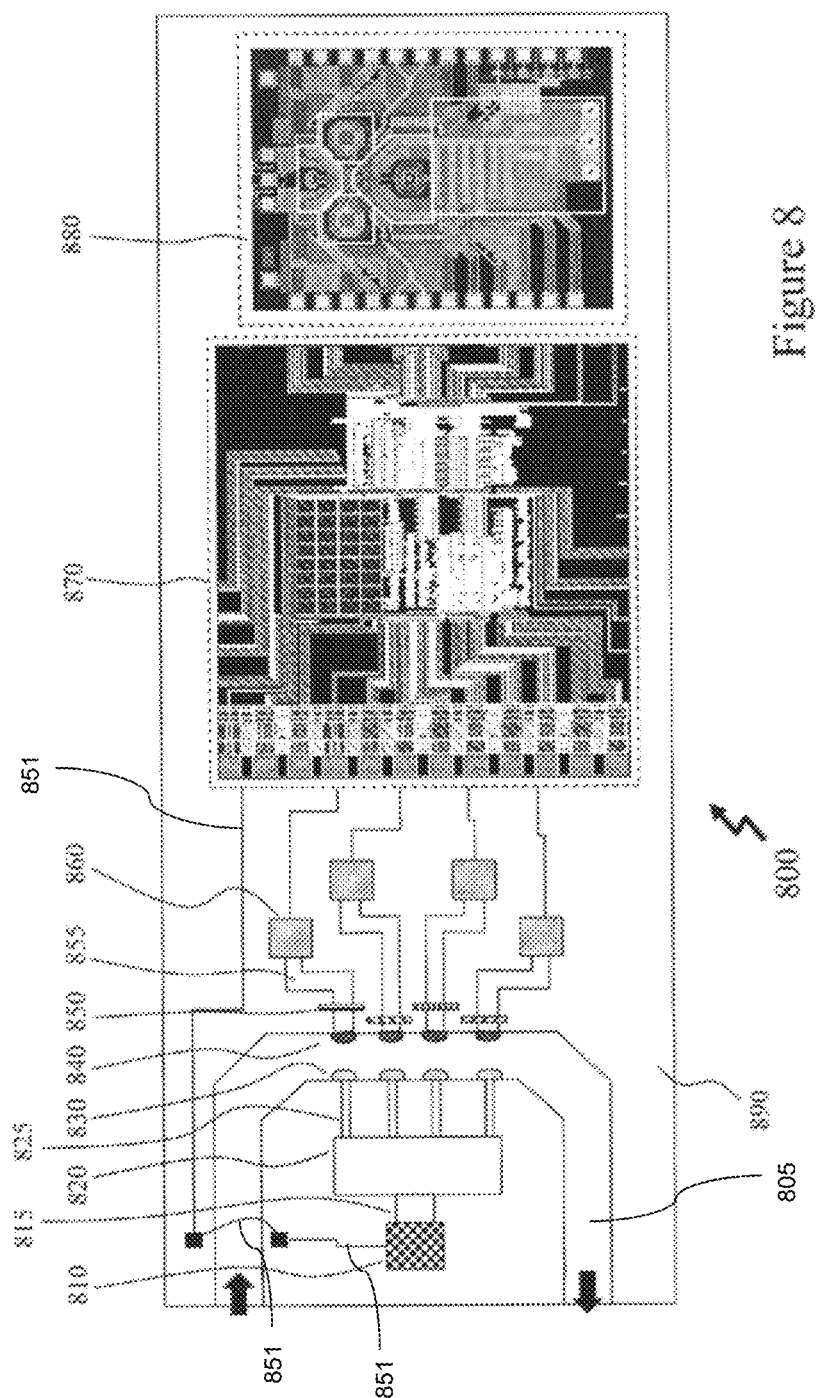
FIG. 8 depicts a hybrid integrated circuit based luminescence sensing system based upon implementing an electronic measurement circuit according to an embodiment of the invention.

Referring to FIG. 8 there is depicted a hybrid integrated circuit luminescence sensing system (HICLSS) 800 based upon implementing an electronic measurement circuit according to an embodiment of the invention. As described above HICLESS 800 is the second partition 620 in FIG. 6 and provides integration of Measurement System 400C, Optical Sub-System 400B and Sensor Array 400A of the HMFSS 400. As shown HICLESS 800 comprises an Optical Source 810 electrically connected to Measurement Sub-System 870, comprising electronic excitation circuit and electronic read circuit as described above, to receive the control signals providing the analog modulation to the optical source 810. This electrical connection is shown at reference numeral 851. Measurement Sub-System 870 for example being Measurement System 400C in FIG. 4A, MSS 4000 in FIG. 4B, or PECMC 500 in FIG. 5. Optical Source 810 being for example flip-chip mounted to the silicon substrate 890 wherein a micro-machined facet couples the emitted optical signal from the Optical Source 810 into first multimode waveguide 815, which may be for example a silicon oxynitride waveguide to support ultraviolet wavelengths emitted by Optical Source 810.

First multimode waveguide 815 couples to Optical Splitter 820, depicted as a 1:4 splitter, wherein the split optical signal is coupled to second multimode waveguides 825. These terminate on an edge of Micro-Channel 805 that allows flow of liquid through the HICLSS 800 wherein the analytes to be measured are in the liquid. Disposed at the edge of Micro-Channel 805 are Micro-Lenses 830 that reduce the divergence of the optical signals within the unguided portion of the optical path formed by the liquid within the Micro-Channel 805. Such Micro-Lenses 830 for example being formed by under-cutting the second multimode waveguides 825 and selectively etching or flame processing the resulting projecting second multimode waveguides 825.

The optical signals from the Micro-Lenses 830 illuminate Sensor substrates 840 on the other side of the fluidic Channel 805. Such Sensor substrates 840 for example being xerogels deposited and formed at these predetermined locations and including within their matrices the capture materials and fluorescent materials. The optical signal propagating through the Sensor substrates 840 and the emitted fluorescent signals are coupled to third multimode waveguides 855 which are coupled to flip-chip photodetectors 860. Disposed within each third multimode waveguide is a thin-film wavelength filter 850 inserted into a slot formed within the silicon substrate 890. As such the flip-chip photodetectors 860 only receive the fluorescent signals emitted from their respective Sensor substrate 840. Where the fluorescent signals are within the visible and near-infrared the third multimode waveguides 855 may be formed from silicon oxide as well as from silicon oxynitride.

Examples of analytes and the active elements within the Sensor substrate 840 are presented below in Table 1. The electrical signals from the flip-chip photodetectors 860 are coupled to the Measurement Sub-System 870 wherein they are digitized and processed. Within HICLSS 800 the resulting outputs from the Measurement Sub-System 870 are coupled to Wireless Transceiver 880 which may also be implemented in silicon CMOS for example as the Measurement Sub-System 870 is. Accordingly, the outputs from the Measurement Sub-System 870 are wireless transmitted to a remote transceiver for processing.

TABLE 1

Examples of Analytes and Active Agents for Their Detection

| Target Analyte | Active Agent |
| --- | --- |
| Metal ions: Cadmium (Cd(II)), Manganese (Mn(II)), and Nickel (Ni(II)) | DNA enzyme (OA-II, OA-III, and OA-IV) |
| Glucose | Glucose oxidase and ruthenium-tris(4,7-diphenyl-1,10-phenanthroline) dichloride ($Ru(dpp)_3Cl_2$) |
| Bacterial endotoxin | Conavalin-A |
| 2,4,6-trinitrotoluene (TNT) | TNT (sacrificial template) |
| Adenosine triphosphate (ATP) | Bacteriorhodopsin, $F_0F_1$-ATP synthase, and pyranne |
| Metal ions: Cadmium (Cd(II)), copper (Cu(II)), and mercury (Hg(II)) | Urease, acetylcholinesterase, and fluorescin isothiocyanate-dextran |
| Methane-sodium (soil fumigant) and tetradifon (insecticide) | Alkaline-phosphatase |
| Hydrogen peroxide | Horseradish peroxidase |
| Hydrocortisone in human serum | Monoclonal cortisol antibody |

It would be evident to one skilled in the art that the HICLSS 800 may optionally include other interfaces such as I2C, USB, etc rather than the Wireless Transceiver 880 according to the planned deployment and use scenarios. In other applications the interface communicates directly to a processor that displays the result for example. Optionally the fluid within the Micro-Channel 805 is liquid, such as a sample from a patient, or gaseous, such as ambient atmosphere where the HICLSS 800 is currently present. Alternatively the fluid is generated by processing to introduce the materials for analysis into the HLCSS 800.

Similarly, it would be evident that other optical sub-systems may be exploited either in planar, micro-optic or free-space formats to couple the optical signal from the Optical Source 810 to the Sensor substrate 840 and there to the photodetectors 860 via the thin-film filters 850. Optionally, multiple optical sources may be present and coupled to the HICLSS with common drive signal or multiple drive signals and measurement sub-systems may be provided. In some embodiments of the invention the time base of the measurements for a common analyte may be set to two different values within the same HICLSS 800 through such optical sources so that for example measurements at two frequencies are performed. Optionally, a more complex drive signal may be applied and the received photocurrent filtered to generate two received signals at the two frequencies for measurement.

Within the embodiments of the invention presented above optical filtering has been presented as being implemented between the sensor elements and the optical detector. In some instances it may be beneficial to filter the optical source prior to the sensor elements. For example, within an $O_2$ sensor such as presented above employing $[Ru(dpp)_3]^{2+}$ an optical source in the blue region of the visible spectrum, for example having a peak emission wavelength at $\lambda_{peak}=470$ nm, might be filtered with a short pass wavelength filter $\lambda_{cut-on}=530$ nm to remove the "yellow-tail" wavelengths of the GaN blue LED that can extend into the emission spectrum of the $[Ru(dpp)_3]^{2+}$. The emission spectrum being filtered with a long-pass filter, for example $\lambda_{cut-off}=590$ nm.

Application of Xerogel Based Sensors to Sleep Apnea

Within the description supra in respect of FIG. 1 through 8 xerogel based sensors and xerogel based sensor systems have been presented according to embodiments of the invention. Amongst the large number of applications of xerogel based sensors the following description with reference to FIGS. 9 through 12 presents one such application to sleep apnea.

Sleep apnea is a sleep disorder characterized by abnormal pauses in breathing or instances of abnormally low breathing during sleep affecting approximately 4% of all men and approximately 2% of all women. There are essentially three forms of sleep apnea, central (CSA), obstructive (OSA) and complex (combined CSA and OSA) constituting 0.4%, 84% and 15% of cases respectively. In CSA, breathing is interrupted by a lack of respiratory effort. In contrast in OSA, breathing is interrupted due to intermittent closures or partial obstructions occurring in the upper respiratory track or oropharynx during sleep. In untreated sleep apnea, breathing is briefly interrupted or becomes very shallow during sleep. These breathing pauses typically last between 10 to 20 seconds and can occur up to hundreds of times a night, and may disturb the individual out of their natural sleep rhythm or result in concern and sleep interruptions for a parent or partner of the individual. As a consequence, the individual typically spends more time in light sleep and less time in the deep, restorative sleep a person needs to be energetic, mentally sharp, and productive the following day.

In adults, chronic sleep deprivation results in daytime sleepiness, slow reflexes, poor concentration, and an increased risk of accidents. Sleep apnea can also lead to serious health problems over time, including diabetes, high blood pressure, heart disease, stroke, and weight gain. While OSA can be common in children, it's not always easy to recognize. In addition to continuous snoring, children with sleep apnea may adopt strange sleeping positions and suffer from bedwetting, excessive perspiration at night, or night terrors. Children with sleep apnea may also exhibit changes in their daytime behavior including hyperactivity or inattention, developmental and growth problems, decrease in school performance, irritable, angry, or hostile behaviour, and breathing through their mouth instead of their nose.

Figure 9:
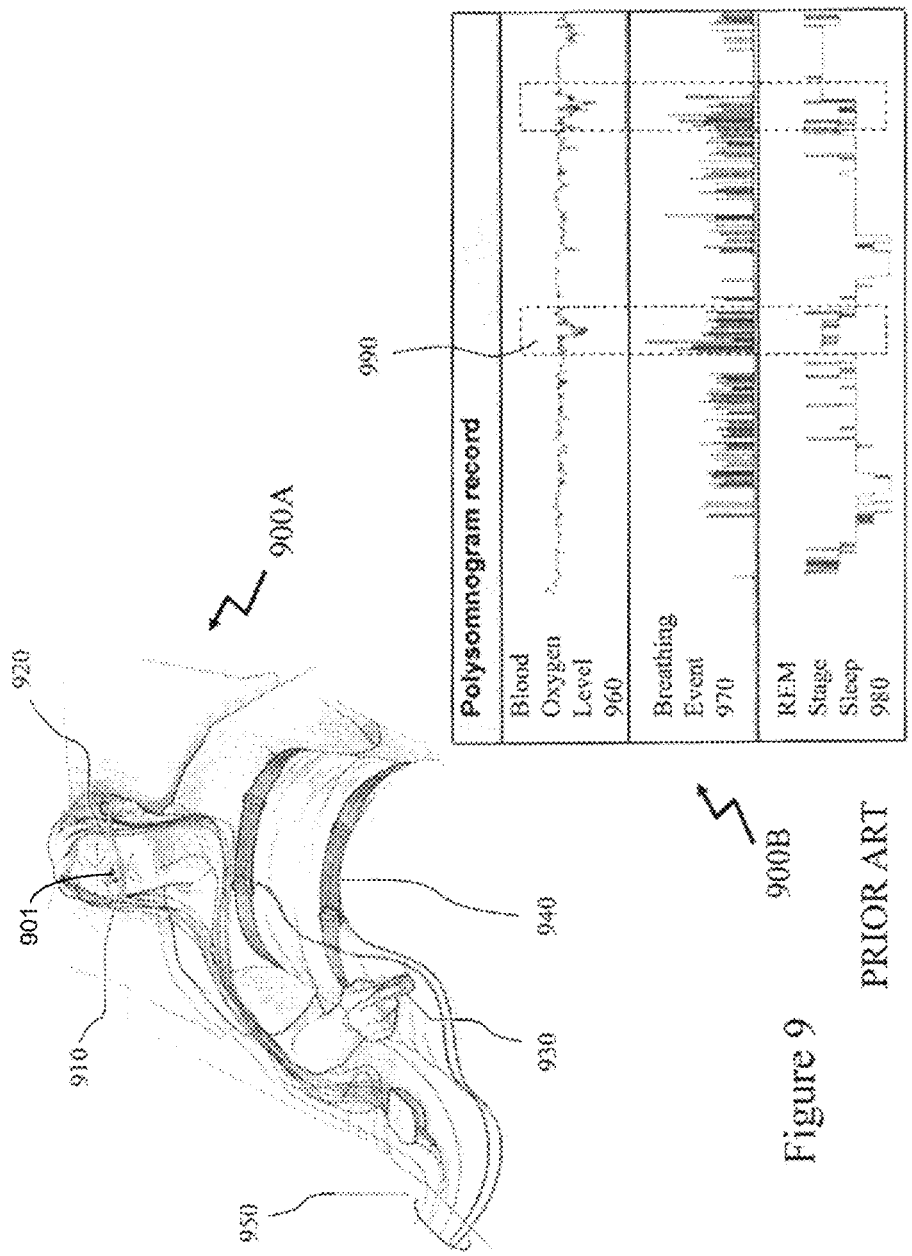
FIG. 9 depicts a sleep apnea assessment system according to the prior art.

However, with early diagnosis and proper treatment an individual can control the symptoms, get their sleep back on track, and start enjoying what it's like to be refreshed and alert every day. The current diagnosis of sleep apnea is based on the conjoint evaluation of clinical symptoms and of the results of a formal sleep study, polysomnography. A pictorial representation of a typical prior art polysomnography study as performed today is shown in FIG. 9 which aims at establishing an "objective" diagnosis indicator linked to the quantity of apneic events per hour of sleep (Apnea Hypopnea Index (AHI), or Respiratory Disturbance Index (RDI)), associated to a formal threshold, above which a patient is considered as suffering from sleep apnea, and the severity of their sleep apnea can then be quantified. Mild OSA (Obstructive Sleep Apneas) ranges from 5 to 14.9 events per hour of sleep, moderate OSA falls in the range of 15-29.9 events per hour of sleep, and severe OSA would be a patient having over 30 events per hour of sleep. One example of a commonly adopted definition of an apnea (for an adult) includes a minimum 10 second interval between breaths, with either a neurological arousal (a 3-second or greater shift in EEG frequency) or a blood oxygen desaturation of 34% or greater, or both arousal and desaturation. The polysomnography study is undertaken at a sleep center, hospital or clinic under the supervision of a doctor or nurse and is an expensive test costing up to $2,500.

As depicted in FIG. 9 in first image 900A the individual sleeps with a variety of sensors attached to them. These typically include, for example, Airflow Sensor 910 at the patient's nose 901 to measure airflow, Head Sensors 920 attached to their face and/or scalp to measure factors such as eye movement and brain activity. An Elastic Belt Sensors 940 around the individual's chest and stomach measure the amount of effort for their breathing whilst Oxygen Sensor 930, typically clamped to their finger, measures the amount of oxygen in their blood. All of these sensors result in a Harness 950 connecting them to a computer, typically with a technician monitoring to ensure the test executes correctly. The resulting polysomnogram 900B shows Blood Oxygen Level 960, Breathing Event 970, and REM Stage Sleep 980 as a function of time. Within this an Event 990 is depicted with a drop in blood oxygen shortly after a breathing event, the higher the line on Breathing Event 970 the more effort the individual is making to breath. On the REM Stage Sleep 980 profile levels towards the bottom represent deep sleep whilst higher levels indicate awake and REM sleep. Accordingly, at the same time the patient leaves deep sleep and enters a lighter sleep state during event 990. One issue with a test such as depicted in first image 900A is that the patient is generally in an unnatural clinical environment, has multiple sensors that interfere with their freedom of movement and has a heavy Harness 950 hooked up to them and the sensors.

Untreated sleep apnea can cause detrimental effects to patient's health, personal safety and career progression. Hence, it would be beneficial to provide for an early, low cost, and simple home based diagnosis of sleep apnea in order to either inform patient to take necessary treatment or provide feedback as to how they are progressing to correct the problem. Pulse Oximetry is one approach, which may be performed overnight in a patient's home. It is an easier alterative than formal sleep study of polysomnography. In addition, home oximetry may be equally effective in guiding prescription for automatically self-adjusting continuous positive airway pressure. A Pulse Oximeter is small device that is attached to a fingertip to measure the oxygen saturation of the blood. That is, the percent of the total hemoglobin that is combined with oxygen. This monitors the difference in the color of the oxygenated and the deoxygenated haemoglobins in the blood. Recordings of blood oxygen saturation during sleep can provide an estimate of the severity of any sleep apnea related problems. However, pulse oximetry is not considered to be a reliable screening tool for diagnosing sleep apnea due to limited amount of diagnosis data associated with the oxygen saturation data.

Figure 10:
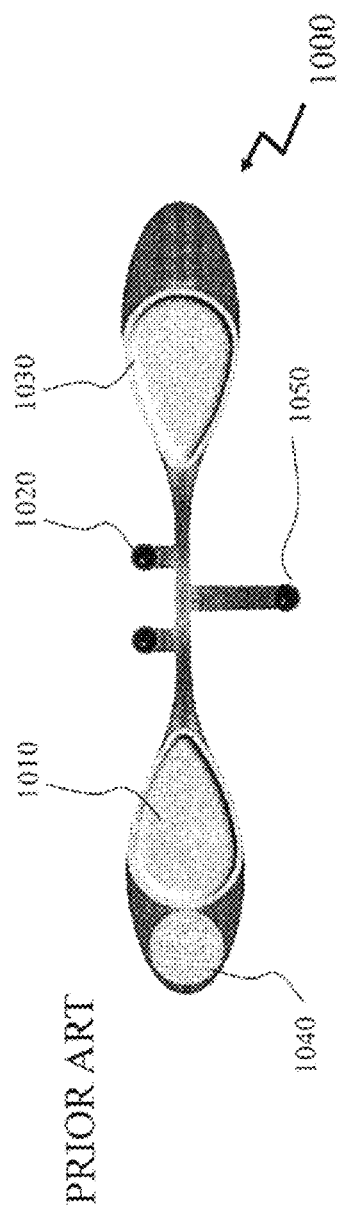
FIG. 10 depicts a sleep apnea assessment system according to the prior art.
Figure 11:
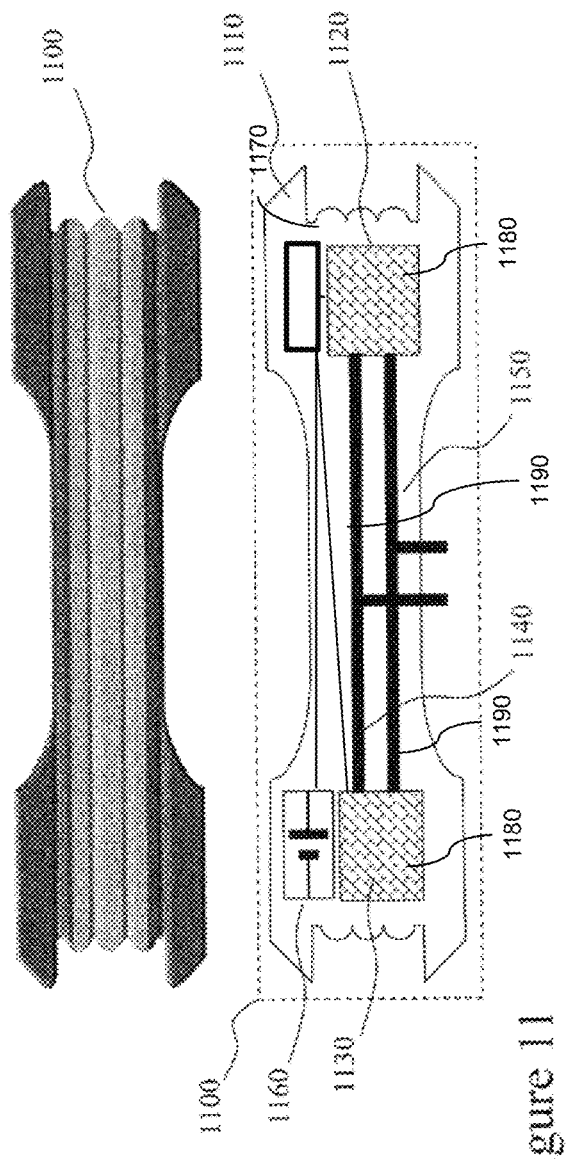
FIG. 11 depicts a sleep apnea assessment system according to an embodiment of the invention.

One such instrument is the United States Food and Drug Administration's (FDA) approved SleepStrip® 1000 from Accutest Inc., which is a disposable single use home screening test for sleep apnea. Several research studies have shown that its indications correlate well with those of formal sleep studies. The SleepStrip® 1000 as depicted in FIG. 10 has an integrated microprocessor (CPU) 1010 that measures the number of times a patient stops breathing during sleep and then determines the presence and severity of Sleep Apnea. SleepStrip® 1000 also comprises a Battery 1030, Display 1040, Nasal Flow Sensors 1020 based upon thermal sensor elements, and Oral Flow Sensor 1050 which is similarly a thermally based sensor element. The CPU 1010 determines a rate of events and assigns a severity which is then displayed to the individual on the Display 1040. These severities being:

Severity 0—less than 15 events per hour;
Severity 1—15 to 24 events per hour;
Severity 2—25 to 39 events per hour;
Severity 3—40 or more events per hour; and
E—denotes an error A Sleep Apnea Device (SAD) 1100 according to an embodiment of the invention is depicted in FIG. 11 extending the range of data collected during an in-home screening test for sleep apnea which will allow doctors/physicians to make more accurate and reliable prognosis of sleep apnea and its variants between CSA, OSA, and complex. As depicted SAD 1100 comprises a strip 1110 for attachment to the patient's nose, for example via a light duty adhesive, within which are embedded first and second flow tubes 1140 and 1150 respectively which couple to first and second silicon circuits 1120 and 1130 respectively. Also coupled to the first and second silicon circuits 1120 and 1130 respectively is thin-film battery 1160 in order to power the measurement circuits within the first and second silicon circuits 1120 and 1130 respectively and CPU/memory within one or other of the first and second silicon circuits 1120 and 1130 respectively. As shown, in this embodiment, each of the first and second flow tubes 1140 and 1150 extends from a first portion to a second portion 1190. As can be understood, the first portions of the first and second flow tubes 1140 and 1150 are flowingly coupled to the outgoing nasal flow from the patient's nose 901 (see FIG. 9) and the second portions 1190 of the first and second flow tubes 1140 and 1150 are flowingly coupled to the plurality of sensors comprised in the strip 1110. As depicted in this specific example, the strip 1110 comprises at least the second portions 1190 of the flow tubes.

Examples of the additional data that may form part of SAD 1100 by exploiting silicon electronic circuits in conjunction with xerogel based sensors include, but are not limited to, the provisioning of:

Air Flow Sensor Data wherein an air flow sensor detects inhalation and measures both the number of times a patient stops breathing during sleep and the in-take air quantity useful for determining the obstructions occurring in the upper respiratory track;

Oxygen Sensor Data providing data relating to the relative transfer of oxygen;

Carbon Dioxide Sensor Data providing data relating to the relative transfer of carbon dioxide;

Pulse Oximeter Data to determine blood-oxygen concentration; and

Accelerometer Data to provide data relating to the orientation of the patient's head.

Additional sensors such as an accelerometer placed on the patient chest to provide data related to the amount of physical effort made towards breathing, may be provided. SAD 1100 and these additional sensors may wirelessly transmit to a portable electronic device, such as the individual's smartphone, in order to store the data and transmit this to a remote server for analysis by a physician or the individual's doctor for example. Providing both oxygen and carbon dioxide sensors at exhalation that measure the relative transfer of oxygen and carbon dioxide allows determination of whether hypoxemia and hypercapnia conditions exist. After the episode of apnea, breathing may be faster (hyperpnea) for a period of time, a compensatory mechanism to blow off retained waste gases and absorb more oxygen. Additionally, both oxygen and carbon dioxide sensors would determine the total amount of gases retained in the respiratory track.

Figure 12:
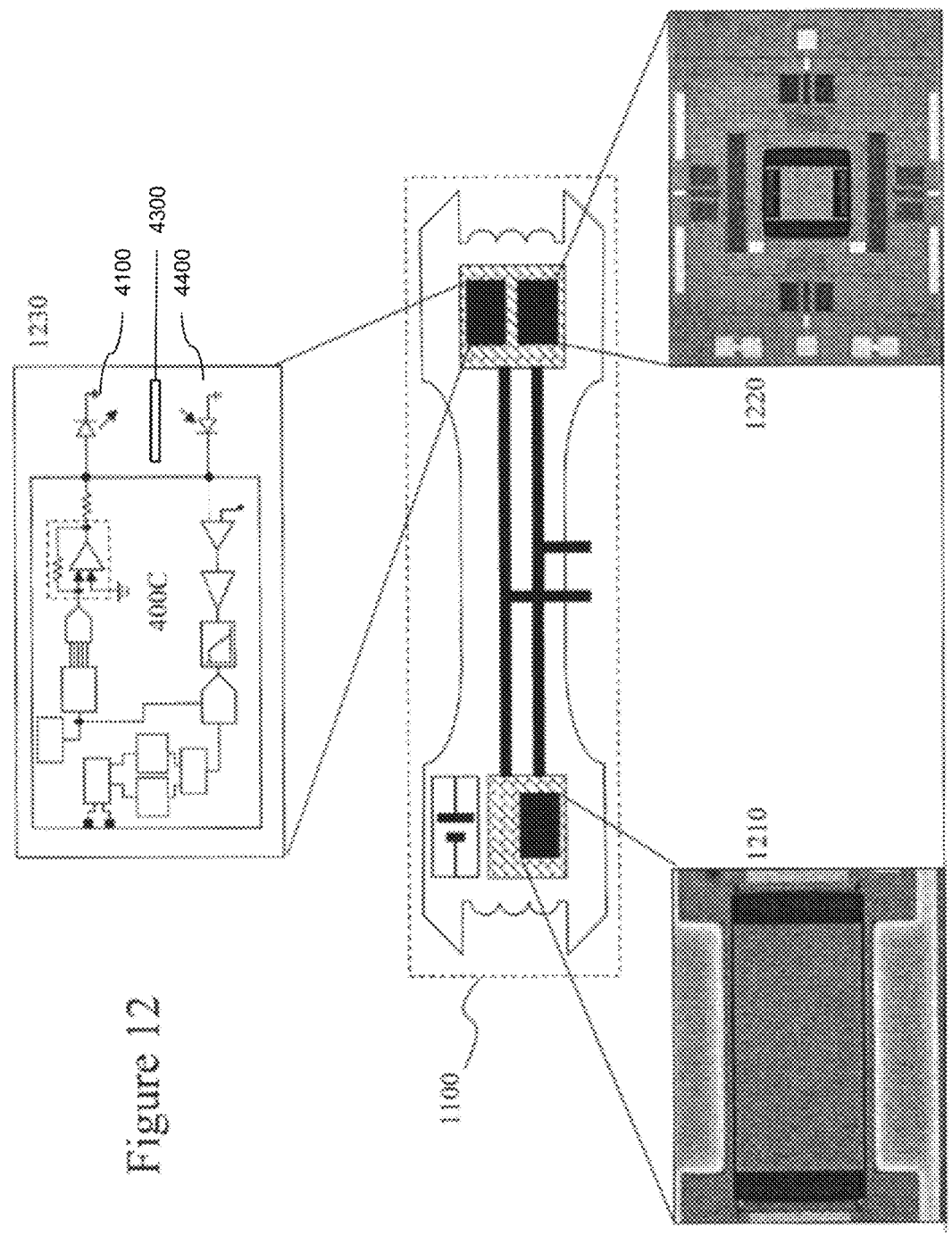
FIG. 12 depicts silicon integrated circuit and microelectromechanical circuit elements forming portions of a sleep apnea assessment system according to an embodiment of the invention.

As depicted in respect of FIG. 12 exemplary active elements within a SAD 1100 are depicted. For example, oxygen and carbon dioxide sensors may be provided via Xerogel Sensor 1230 which exploits an HMFSS such as HMFSS 400C depicted and described in respect of FIG. 4A and HMFSS 4000 depicted and described in respect of FIG. 4A. Air flow sensor 1210 may exploit a microelectromechanical (MEMS) structure providing upstream and downstream thermocouples either side of an array of thin film heaters. Such a MEMS air flow sensor 1210 may for example exploit a commercial MEMS process such as SOIMUMPS which is compatible with standard wafer bonding techniques for assembly with CMOS Si circuit wafers. Other MEMS technologies are compatible with direct CMOS Si circuit wafer integration rather than hybrid integration. Also depicted is 3 axis MEMS accelerometer 1220 which can be similarly manufactured according to design using commercial MEMS processes such as SOIMUMPS as well as others with direct CMOS Si circuit wafer integration rather than hybrid integration.

Accordingly a SAD 1100 may integrate multiple silicon MEMS sensor devices together with xerogel based sensor devices according to embodiments of the invention. It would be evident that in addition to sleep apnea a variety of sensors may be implemented for a variety of biological and/or chemical measurements either discretely or in combination with at least one of MEMS circuits and silicon CMOS electronics for example.

Many other variants would be evident to one skilled in the art without departing from the scope of the invention. The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A system comprising:
a plurality of optical sources disposed in a predetermined relationship with a fluidic channel formed within a silicon substrate, each optical source emitting a first optical signal over a first predetermined wavelength range and capable of analog modulation over a predetermined frequency range;
a plurality of analyte sensors each optically coupled to a predetermined subset of the optical sources and disposed in a predetermined relationship with the fluidic channel and its predetermined subset of the optical sources, wherein the plurality of analyte sensors each formed upon a sensor substrate and each incorporating a fluorescent material immobilized to a capture material selected in dependence upon an analyte to be measured and each fluorescent material emits a second optical signal over a second predetermined wavelength range;
an optical detection circuit comprising a plurality of optical detectors, each configured to receive only one second optical signal of the plurality of second optical signals emitted by one of the fluorescent materials and generating a corresponding one of a plurality of photocurrents in dependence thereof;
an electrical excitation circuit integrated within the silicon substrate electrically coupled to the plurality of optical sources and comprising a direct digital synthesizer and a digital-to-analog converter configured for generating an analog signal modulating each optical source of the plurality of optical sources; and
an electrical read circuit integrated within the silicon substrate electrically coupled to the plurality of optical detectors and comprising a multiplexer configured for multiplexing a predetermined portion of each of the plurality of photocurrents into a multiplexed signal, the electrical read circuit comprising an analog-to-digital converter and a digital Fourier transform processor configured for receiving the multiplexed signal from the multiplexer, measuring a plurality of phase differences each being indicative of a phase difference between a corresponding one of the plurality of photocurrents and the generated analog signal based on the multiplexed signal, and generating a digital output in dependence upon the plurality of phase differences;
a number of the plurality of optical detectors being at least a same or more than a number of the plurality of analyte sensors.

2. The system according to claim 1, wherein
the electrical excitation circuit and electrical read circuit form predetermined portions of a Complementary Metal Oxide Semiconductor (CMOS) integrated circuit.

3. The system according to claim 1, further comprising;
a wavelength filter disposed between the analyte sensor and the optical source, the filter blocking a predetermined portion of the first predetermined wavelength range overlapping a predetermined portion of the second predetermined wavelength range.

4. The system according to claim 1, wherein
the sensor substrate is a gel being selected from the group comprising xerogels, sol-gels, aerogels, hydrogels, and organogels.

5. The system according to claim 1, wherein
each analyte sensor of the plurality of analyte sensors employs a different capture material; and
a first predetermined subset of the plurality of analyte sensors receive the first optical signal and second predetermined subset of the plurality of analyte sensors receive a third optical signal from a second optical source emitting the third optical signal over a third predetermined wavelength range and capable of analog modulation over the predetermined frequency range.

* * * * *